«12» United States Patent
Shaburov et al.

(10) Patent No.: US 10,810,418 B1
(45) Date of Patent: *Oct. 20, 2020

(54) OBJECT MODELING AND REPLACEMENT IN A VIDEO STREAM

(71) Applicant: Snap Inc., Santa Monica, CA (US)

(72) Inventors: Victor Shaburov, Pacific Palisades, CA (US); Yurii Monastyrshyn, Santa Monica, CA (US); Oleksandr Pyshchenko, Los Angeles, CA (US); Sergei Kotcur, Sochi (RU)

(73) Assignee: Snap Inc., Santa Monica, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/122,630

(22) Filed: Sep. 5, 2018

Related U.S. Application Data

(63) Continuation of application No. 15/199,482, filed on Jun. 30, 2016, now Pat. No. 10,102,423.

(51) Int. Cl.
G06K 9/00 (2006.01)
G06T 7/90 (2017.01)
(Continued)

(52) U.S. Cl.
CPC ........ G06K 9/00382 (2013.01); A63F 13/213 (2014.09); A63F 13/22 (2014.09);
(Continued)

(58) Field of Classification Search
None
See application file for complete search history.

(56) References Cited

U.S. PATENT DOCUMENTS 6,038,295 A   3/2000  Mattes
6,980,909 B2  12/2005 Root et al.
(Continued)

FOREIGN PATENT DOCUMENTS

CA     2887596 A1       7/2015
CN     109641153        4/2019
WO     WO-2018006064 A1 1/2018

OTHER PUBLICATIONS

"Korean Application Serial No. 10-2019-7002520, Notice of Preliminary Rejection dated Sep. 30, 2019", w/ English Translation, 4 pgs.

(Continued)

Primary Examiner — Shervin K Nakhjavan
(74) Attorney, Agent, or Firm — Schwegman Lundberg & Woessner, P.A.

(57) ABSTRACT

Systems, devices, and methods are presented for segmenting an image of a video stream with a client device by receiving one or more images depicting an object of interest and determining pixels within the one or more images corresponding to the object of interest. The systems, devices, and methods identify a position of a portion of the object of interest and determine a direction for the portion of the object of interest. Based on the direction of the portion of the object of interest, a histogram threshold is dynamically modified for identifying pixels as corresponding to the portion of the object of interest. The portion of the object of interest is replaced with a graphical interface element aligned with the direction of the portion of the object of interest.

18 Claims, 10 Drawing Sheets

(51) Int. Cl.
*G06T 7/73* (2017.01)
*A63F 13/22* (2014.01)
*A63F 13/213* (2014.01)
*A63F 13/655* (2014.01)
*A63F 13/837* (2014.01)
*A63F 13/428* (2014.01)
*A63F 13/52* (2014.01)

(52) U.S. Cl.
CPC ............ *A63F 13/428* (2014.09); *A63F 13/52* (2014.09); *A63F 13/655* (2014.09); *A63F 13/837* (2014.09); *G06T 7/73* (2017.01); *G06T 7/90* (2017.01); *G06T 2207/10024* (2013.01); *G06T 2207/20072* (2013.01); *G06T 2207/30196* (2013.01)

(56) References Cited

U.S. PATENT DOCUMENTS

| | | | |
|---|---|---|---|
| 7,173,651 | B1 | 2/2007 | Knowles |
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,306,267 | B1* | 11/2012 | Gossweiler, III .. G06K 9/00261 382/103 |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,110,541 | B1* | 8/2015 | Zhou ...................... G06F 3/042 |
| 9,191,776 | B2 | 11/2015 | Root et al. |
| 9,204,252 | B2 | 12/2015 | Root |
| 9,361,507 | B1 | 6/2016 | Hoyos et al. |
| 9,367,951 | B1* | 6/2016 | Gray ...................... G06T 15/20 |
| 9,443,227 | B2 | 9/2016 | Evans et al. |
| 9,489,661 | B2 | 11/2016 | Evans et al. |
| 9,491,134 | B2 | 11/2016 | Rosen et al. |
| 10,102,423 | B2 | 10/2018 | Shaburov et al. |
| 2001/0042245 | A1* | 11/2001 | Iwamura ................ G06F 3/005 725/1 |
| 2003/0137494 | A1 | 7/2003 | Tulbert et al. |
| 2007/0298882 | A1* | 12/2007 | Marks ...................... A63F 13/00 463/36 |
| 2008/0273755 | A1 | 11/2008 | Hildreth |
| 2009/0027337 | A1 | 6/2009 | Hildreth |
| 2010/0156781 | A1* | 6/2010 | Fahn ................ H04M 1/72544 345/156 |
| 2010/0328319 | A1* | 12/2010 | Ikenoue ............. G06K 9/00355 345/474 |
| 2011/0052007 | A1* | 3/2011 | Chen ...................... G06F 3/0416 382/103 |
| 2011/0058711 | A1* | 3/2011 | Noda ...................... G06F 3/012 382/116 |
| 2011/0202598 | A1 | 8/2011 | Evans et al. |
| 2012/0051605 | A1 | 3/2012 | Nagar et al. |
| 2012/0159330 | A1* | 6/2012 | Jeong .................... G06F 3/017 715/716 |
| 2012/0209924 | A1 | 8/2012 | Evans et al. |
| 2013/0050076 | A1* | 2/2013 | Hong ..................... G06F 3/017 345/157 |
| 2013/0063345 | A1* | 3/2013 | Maeda .................. G06F 3/017 345/156 |
| 2013/0076625 | A1* | 3/2013 | Yamashita ............ G06F 3/041 345/157 |
| 2013/0155228 | A1* | 6/2013 | Farn ..................... H04N 19/543 348/143 |
| 2013/0229348 | A1* | 9/2013 | Lee .......................... G06F 3/017 345/163 |
| 2013/0241819 | A1* | 9/2013 | Yamashita ............ G06F 3/017 345/156 |
| 2014/0208274 | A1* | 7/2014 | Smyth .................. G06F 3/0304 715/863 |
| 2014/0298273 | A1* | 10/2014 | Blackstone ............. G06F 3/017 715/863 |
| 2014/0336848 | A1* | 11/2014 | Saund ..................... G06T 7/215 701/3 |
| 2015/0015490 | A1* | 1/2015 | Ahn ...................... G06F 3/011 345/166 |
| 2015/0026646 | A1* | 1/2015 | Ahn .................... G06K 9/00201 715/863 |
| 2015/0192777 | A1* | 7/2015 | Bae ..................... G02B 27/0172 345/175 |
| 2015/0199021 | A1* | 7/2015 | Jeon .................... G06F 3/04817 345/158 |
| 2015/0316996 | A1* | 11/2015 | Dal Mutto .......... G06F 3/04815 345/156 |
| 2015/0339757 | A1 | 11/2015 | Aarabi |
| 2016/0054802 | A1* | 2/2016 | Dickerson ............. G06F 3/0488 345/158 |
| 2016/0124513 | A1 | 5/2016 | Dal Zot |
| 2016/0370865 | A1* | 12/2016 | Sakamoto ................ G06F 3/01 |
| 2016/0378294 | A1* | 12/2016 | Wright ................ G06F 3/04815 715/851 |
| 2018/0005026 | A1* | 1/2018 | Shaburov ............ G06K 9/00382 |
| 2018/0307309 | A1* | 10/2018 | Sawada .................. G06F 3/017 |
| 2020/0016492 | A1* | 1/2020 | Nguyen ................ G07F 17/323 |

OTHER PUBLICATIONS

"Korean Application Serial No. 10-2019-7002520, Response filed Nov. 5, 2019 to Notice of Preliminary Rejection dated Sep. 30, 2019", w/ English Claims, 16 pgs.
"International Application Serial No. PCT US2017 040475, International Preliminary Report on Patentability dated Jan. 10, 2019", 11 pgs.
"European Application Serial No. 17740548.7, Response filed Mar. 27, 2019 to Communication Pursuant to Rules 161(1) and 162 EPC dated Feb. 8, 2019", with English Claims, 38 pgs.
"U.S. Appl. No. 15/199,482, Non Final Office Action dated Jan. 11, 2018", 6 pgs.
"U.S. Appl. No. 15/199,482, Notice of Allowance dated Jun. 8, 2018", 8 pgs.
"U.S. Appl. No. 15/199,482, Response filed Apr. 11, 2018 to Non Final Office Action dated Jan. 11, 2018", 10 pgs.
"International Application Serial No. PCT/US2017/040475, International Search Report dated Oct. 10, 2017", 5 pgs.
"International Application Serial No. PCT/US2017/040475, Written Opinion dated Oct. 10, 2017", 9 pgs.
Akman, Oytun, et al., "Multi-cue Hand Detection and Tracking for a Head-mounted Augmented Reality System", Machine Vision and Applications, vol. 24, No. 5, (Apr. 13, 2013), 15 pgs.
Chan, A T S, et al., "Real-time tracking of hand gestures for interactive game design", IEEE International Symposium on Industrial Electronics, Seoul, Korea, (Jul. 2009), 6 pgs.
Dadgostar, F, et al., "An adaptive real-time skin detector based on Hue thresholding: A comparison on two motion tracking methods", Pattern Recognition Letters, vol. 27, No. 12, (Sep. 1, 2006), 11 pgs.
Leyden, John, "This SMS will self-destruct in 40 seconds", URL: http://www.theregister.co.uk/2005/12/12/stealthtext/, (Dec. 12, 2005), 1 pg.

* cited by examiner

OBJECT MODELING AND REPLACEMENT IN A VIDEO STREAM

PRIORITY CLAIM

This application is a continuation of and claims the benefit of priority of U.S. patent application Ser. No. 15/199,482, filed on Jun. 30, 2016, which is hereby incorporated by reference herein in its entirety

TECHNICAL FIELD

Embodiments of the present disclosure relate generally to automated image segmentation of a video stream. More particularly, but not by way of limitation, the present disclosure addresses systems and methods for segmenting a video stream to generate a model of an object and replace a depiction of the object within a video stream.

BACKGROUND

Telecommunications applications and devices can provide communication between multiple users using a variety of media, such as text, images, sound recordings, and/or video recordings. For example, video conferencing allows two or more individuals to communicate with each other using a combination of software applications, telecommunications devices, and a telecommunications network. Telecommunications devices may also record video streams to transmit as messages across a telecommunications network.

Video games generally enable users to control interactive elements depicted on a display device to interact with predetermined objects within a programmed encounter. The user playing the video game often controls a predetermined character or generally progresses through a predetermined game play including a set of preprogrammed events or challenges in a game environment that is determined prior to initiation of a gaming session.

BRIEF DESCRIPTION OF THE DRAWINGS

Various ones of the appended drawings merely illustrate example embodiments of the present disclosure and should not be considered as limiting its scope.

Figure 1:
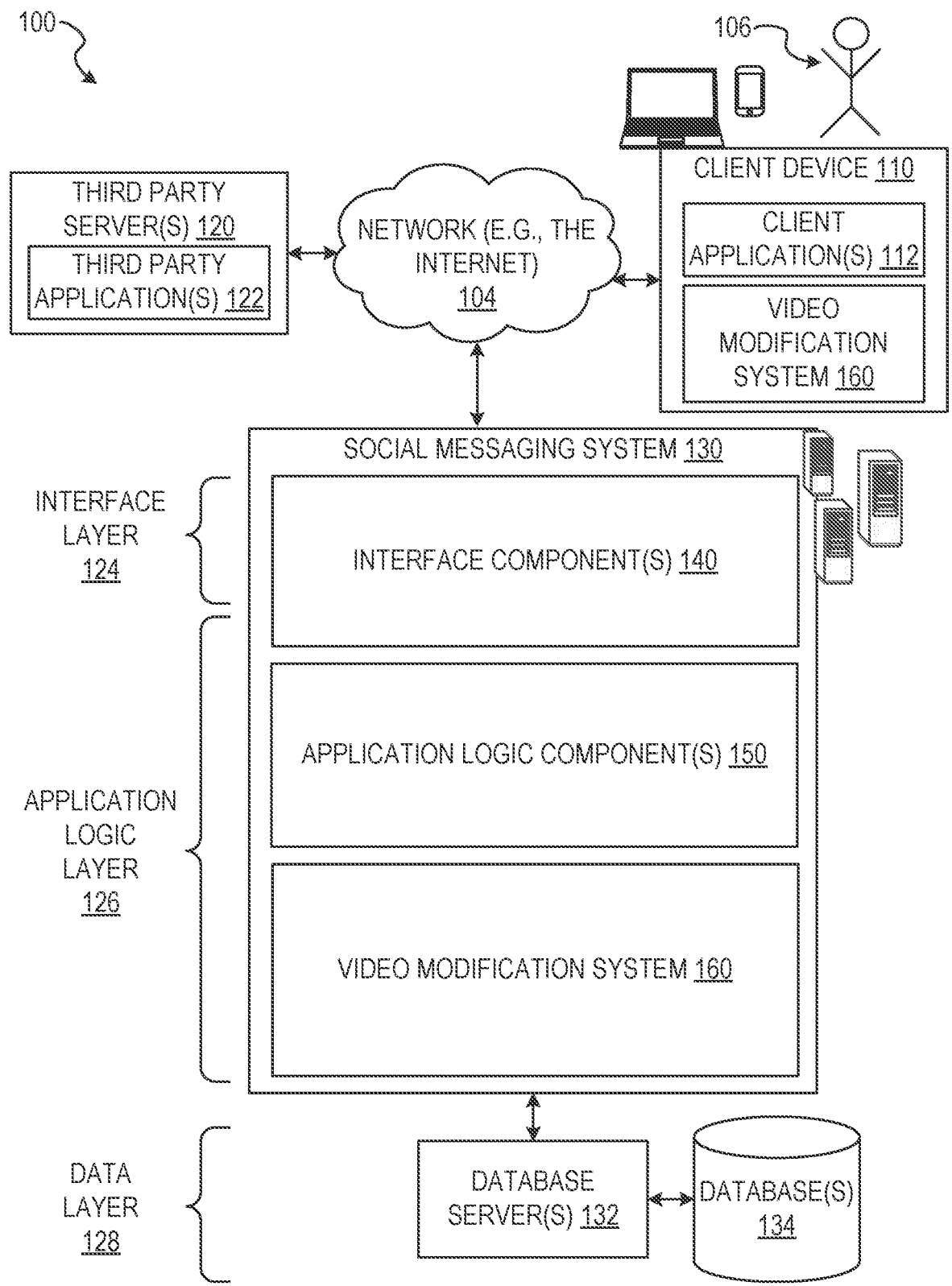
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although telecommunications applications and devices exist to provide video communication between two devices or video recording operations within a single device, telecommunications devices are generally limited in modification of video streams. For example, telecommunications applications are often limited in operations of capturing, measuring, modeling, and modifying aspects of the video stream during capture of the video stream while displaying the modified version of the video stream. Methods generally accepted for editing or modifying video do not model or modify video or video communications as the video is being captured or the video communication is being conducted. Similarly, video game applications and devices exist to provide preprogrammed gaming environments and interactions within a set of possible simulated environments and predetermined possible interactions. Video game applications and devices are generally limited to preprogrammed interactions and environments without enabling modification of a video stream during capture of the video stream and enabling interaction within a gaming environment incorporating the unmodified or modified video stream. Accordingly, there is still a need in the art to improve video communications between devices, video capture and modification operations and devices, and video game applications and devices.

In one embodiment, an application operating on a device includes components for generating a video game environment and interactions based on a video stream while the video stream is being captured by the device. The application identifies a hand within a field of view of the video stream and a finger connected to the hand. The application detects a finger direction based on a position identified for the finger. The hand and the finger within the field of view may be a hand and finger of a user of the device. The application presents the video stream (e.g., a video stream during a video game session) at a client device and generates a graphical interface element aligned with the direction of the finger and replacing the finger and at least a portion of the hand within the video stream. In one embodiment, the graphical interface element is aligned with the direction of the finger such that a point of aim of the graphical interface element represents the direction of the finger determined by the application. The application enables interaction with the video stream and the video gaming environment by movement of one or more of the finger and the hand, changing direction of the finger and the corresponding point of aim of the graphical interface element.

The above is one specific example. The various embodiments of the present disclosure relate to devices and instructions that may be executed by one or more processors of a device to identify objects of interest within a field of view of at least a portion of frames of a video stream and, during capture of the video stream, to model and modify depiction of the objects of interest depicted within the video stream captured by the device. In some embodiments, the video stream is transmitted to another device while the video stream is being captured. In these embodiments, the receiving device may be a video gaming environment server transmitting data representing gaming elements for presentation within the video stream and interaction using the graphical interface element of the modified video stream. In some embodiments, the device capturing the video stream generates and renders the gaming elements within the video stream to create the gaming environment within the video stream during capture of the video stream.

A video modification system is described that identifies and tracks objects of interest present in at least a portion of a video stream and through a set of images comprising the video stream. In various example embodiments, the video modification system identifies and tracks a hand and one or more environmental elements depicted in a video stream. Based on user input of movements of the direction of the finger and corresponding point of aim of the graphical interface element, the video modification system may render gaming elements which interact with the graphical interface element and the one or more environmental elements. The video modification system renders the graphical interface element, the gaming elements, and the interactions thereof and causes presentation of the rendered elements and interactions within the video stream during capture of the video stream. Although described with respect to identifying directions of a finger and a point of aim of a graphical interface element, it should be understood that the video modification system may track any object of interest, as discussed below.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although the network system 100 is illustrated herein as having a client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module, component, or engine shown in FIG. 1 represents a set of executable software instructions and the corresponding hardware (e.g., memory and processor) for executing the instructions, forming a hardware-implemented module, component, or engine and acting, at the time of the execution of instructions, as a special purpose machine configured to carry out a particular set of functions. To avoid obscuring the inventive subject matter with unnecessary detail, various functional modules, components, and engines that are not germane to conveying an understanding of the inventive subject matter have been omitted from FIG. 1. Of course, additional functional modules, components, and engines may be used with a social messaging system, such as that illustrated in FIG. 1, to facilitate additional functionality that is not specifically described herein. Furthermore, the various functional modules, components, and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receive requests from various client-computing devices and servers, such as client devices 110 executing client application(s) 112, and third party servers 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of a video modification system 160 such that components of the video modification system 160 configure the client device 110 to perform a specific set of functions with respect to operations of the video modification system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the video modification system 160 to segment images of video streams during capture of the video streams, modify objects depicted in the video streams, and transmit the video streams (e.g., with image data modified based on the segmented images of the video stream) in real time.

Each of the client devices 110 can comprise a computing device that includes at least a display and communication capabilities with the network 104 to access the social messaging system 130, other client devices, and the third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The user 106 can be a person, a machine, or other means of interacting with the client devices 110. In some embodiments, the user 106 interacts with the social messaging system 130 via the client devices 110. The user 106 may not be part of the network system 100, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with one or more of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the video modification system 160 capable of identifying, tracking, modeling, and modifying objects within video data during capture of the video data by the client device 110. Similarly, the client device 110 includes a portion of the video modification system 160, as described above. In other examples, the client device 110 may include the entirety of the video modification system 160. In instances where the client device 110 includes a portion of (or all of) the video modification system 160, the client device 110 can work alone or in cooperation with the social messaging system 130 to provide the functionality of the video modification system 160 described herein.

In some embodiments, the social messaging system 130 may be an ephemeral message system that enables ephemeral communications where content (e.g., video clips or images) is deleted following a deletion trigger event such as a viewing time or viewing completion. In such embodiments, a device uses the various components described herein within the context of any of generating, sending, receiving, or displaying aspects of an ephemeral message. For example, a device implementing the video modification system 160 may identify, track, model, and modify an object of interest, such as a hand depicted in the video stream. The device may modify the object of interest during capture of the video stream without image processing after capture of the video stream as a part of a generation of content for an ephemeral message.

In some embodiments, the video modification system 160 may be part of a video game system. The video modification system 160 may identify, track, and modify an object of interest within a video stream. Other portions of the video game system may render interactive objects within the video stream in addition to the modified object of interest. In some instances, portions of the video game system may enable interaction with the interactive objects using one or more of gestures or movements of the object of interest; movements of a mobile computing device; selection of physical controls of the mobile computing device; selection of virtual or graphical controls presented on a display device of the mobile computing device; or combinations thereof to provide display of the modified video stream, the modified object of interest, and the interactive objects in a game play environment.

Figure 2:
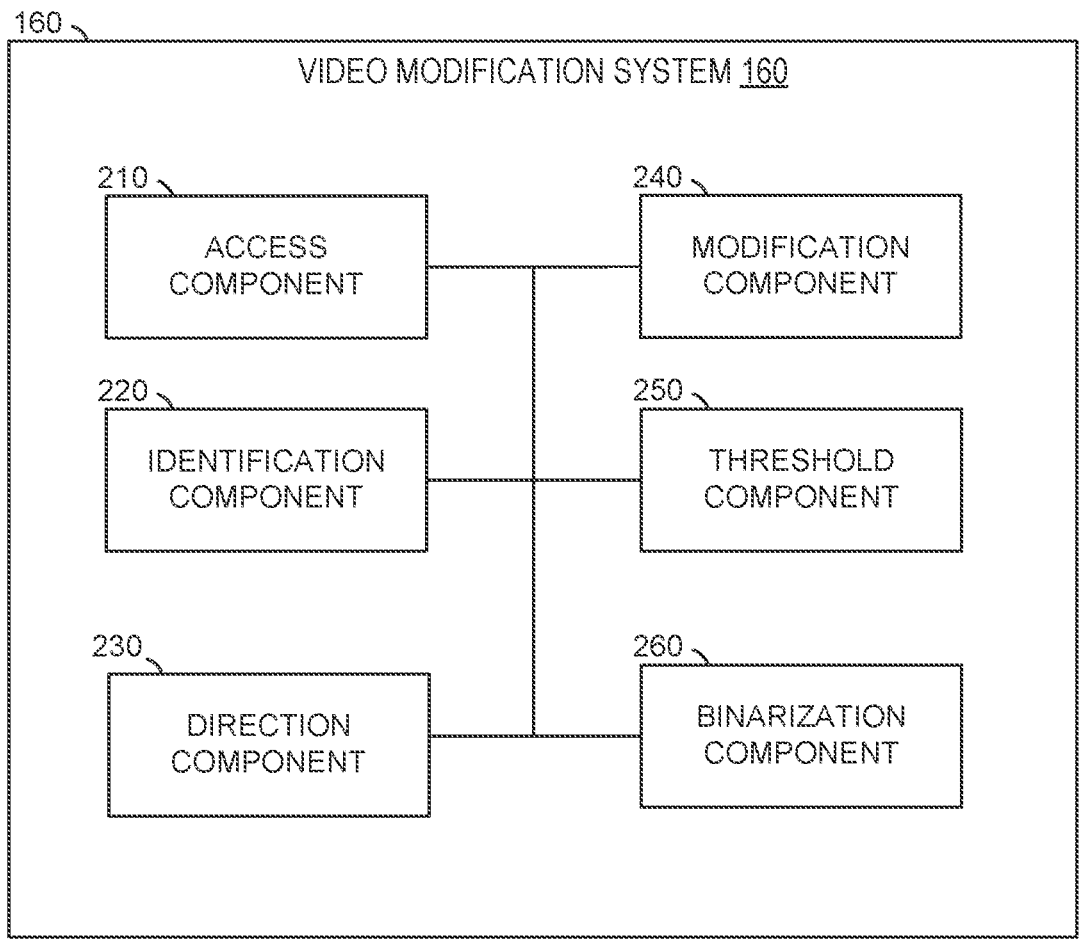
FIG. 2 is a diagram illustrating a video modification system, according to some example embodiments.

FIG. 2 is a diagram illustrating the video modification system 160, according to some example embodiments. In various embodiments, the video modification system 160 can be implemented in conjunction with the client device 110 or as a standalone system, and is not necessarily included in the social messaging system 130. The video modification system 160 is shown to include an access component 210, an identification component 220, a direction component 230, a modification component 240, a threshold component 250, and a binarization component 260. All, or some, of the components 210-260 communicate with each other, for example, via a network coupling, shared memory, and the like. Each component of the components 210-260 can be implemented as a single component, combined into other components, or further subdivided into multiple components. Other components not pertinent to example embodiments can also be included, but are not shown.

The access component 210 receives or accesses a set of images (e.g., frames) in a video stream. In some embodiments, the access component 210 receives the set of images directly from an image capture device of the client device 110. In some instances, an application or component of the client device 110 passes the set of images to the access component 210 for use in one or more of the methods described herein.

The identification component 220 determines or otherwise identifies characteristics relating to objects of interest within the set of images accessed by the access component 210 and a graphical interface element to be inserted into the set of images. In some embodiments, the identification component 220 identifies individual pixels associated with the object of interest. The identification component 220 may identify individual pixels based on color values associated with the pixels. In some embodiments, the identification component 220 identifies the object of interest or portions of the object of interest using one or more image or object recognition processes or by identifying points for generation of a convex polygon. Where the identification component 220 identifies the convex polygon, the identification component 220 may identify separate portions of the object of interest by identifying defects within the convex polygon.

The defects may represent points on the object of interest which are positioned a distance away from a contour line of the convex polygon.

The direction component 230 determines a direction of a portion of the object of interest depicted within one or more frames of the video stream or set of images accessed by the access component 210. For example, where the object of interest is a hand, the direction component 230 may determine a direction in which a finger of the hand is pointing. The direction determined by the direction component 230 may include simulated or actual three dimensional values along x, y, and z axes. For example, the direction may represent a point of aim for the portion of the object of interest. The point of aim may indicate a pixel or area within an image of the set of images and may also indicate a depth represented within the image. In some embodiments, the direction component 230 may determine the direction as a direction line or a vector. The direction line or vector may extend between two points identified along the portion of the object of interest for which a direction value is being determined. In some instances, the direction component 230 may determine the direction using three or more points along the portion of the object of interest. The three or more points may be joined together to form a chevron used to determine the direction of the portion of the object of interest.

The modification component 240 performs modification operations on images within the video stream accessed by the access component 210. In some embodiments, the modification component 240 modifies depictions of the object of interest within the images or frames of the video stream. The modification component 240 may modify the depiction of the object of interest by replacing at least a portion of the object of interest with a graphical interface element. In some instances, the modification component 240 replaces the object of interest completely or positions the graphical interface element to obscure a portion of the object of interest without covering the entirety. For example, where the object of interest is a hand and the graphical interface element is a weapon, such as a laser blaster, the modification component 240 may position the laser blaster (e.g., graphical interface element) such that the hand appears to be holding the laser blaster. In some other examples, the graphical interface element may include a representation of a portion of the object of interest. For example, the graphical interface element may depict a spray paint can and a portion of a hand holding the can in a position to engage a nozzle. In this example, the graphical interface element may be aligned with at least a portion of the object of interest, such as a wrist connected to a hand, and replace or otherwise cover the object of interest.

The threshold component 250 dynamically modifies thresholds set within the video modification system 160 to refine access, interpretation, and modification of frames of the video stream. In some embodiments, the threshold component 250 dynamically modifies a histogram threshold for an image within the video stream. The threshold component 250 may be used in quality assurance operations to remove unwanted or unexpected movements, sizes, proportions, or other performance characteristics which may inhibit or adversely affect display, gameplay, or other presentation of modified frames of the video stream.

The binarization component 260 generates binary images based on the set of images accessed by the access component 210. In some instances, the binarization component 260 generates one or more binarization matrices for the one or more images. The binarization matrices may represent binary versions of the one or more images. In some instances, the binarization component 260 performs one or more binarization operations to generate the binarization matrices. Although described below with specific examples of binarization operations, it should be understood that the binarization component 260 may perform any suitable binarization operations to generate the binarization matrices.

Figure 3:
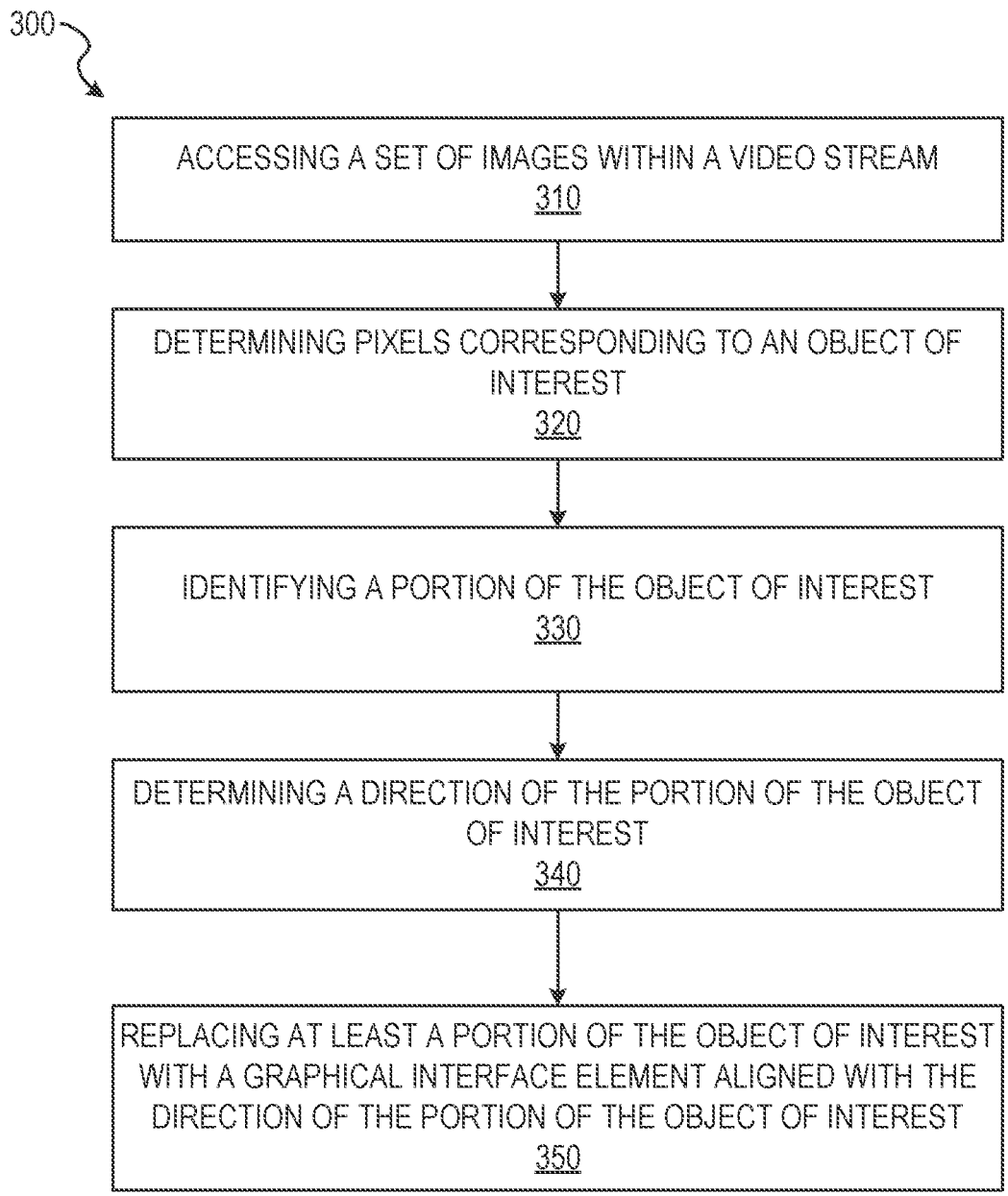
FIG. 3 is a flow diagram illustrating an example method for segmenting portions of a video stream and modifying portions of the video stream based on the segmentation, according to some example embodiments.

FIG. 3 depicts a flow diagram illustrating an example method 300 for segmenting portions of a video stream and modifying portions of the video stream (e.g., representations or depictions of the object of interest) based on the segmentation. The operations of the method 300 may be performed by components of the video modification system 160, and are so described below for purposes of illustration.

In operation 310, the access component 210 receives or otherwise accesses a set of images within a video stream. The set of images may be represented by one or more images depicted within a field of view of an image capture device. In some instances, the access component 210 accesses the video stream captured by the image capture device associated with the client device 110 and presented on the client device 110 as a portion of hardware comprising the access component 210. In these embodiments, the access component 210 directly receives the video stream captured by the image capture device. In some instances, the access component 210 passes all or part of the video stream (e.g., the set of images comprising the video stream) to one or more components of the video modification system 160, as described below in more detail. The set of images may depict at least a portion of an object of interest. In some instances, as will be explained in more detail below, the object of interest may be at least a portion of a hand.

In some instances, operation 310 occurs in response to initiation of a video gaming application or communications application. Once the application is initiated, the application may receive one or more selections of user interface elements presented at a display device of the client device 110. For example, the application may render and cause presentation of a "start" button on the display device. Operation 310 may initiate in response to the application receiving selection of the "start" button. In some instances, selection of the "start" button initiates an image capture device operably connected to the client device 110, such as a camera of a smart phone or tablet. Once the image capture device is initiated, the image capture device begins capturing images or frames of a video stream for access by the access component 210.

In operation 320, the identification component 220 determines pixels, within one or more images of the set of images (e.g., the video stream), corresponding to the object of interest. In some embodiments, the object of interest is the portion of the hand. The identification component 220 may determine the pixels corresponding to the object of interest in a predetermined position or region of the field of view of the image capture device. In some example embodiments, operation 320 includes all or part of a process for detecting and generating a binary image for the object of interest. The binary image may be generated by the binarization component 260. Where the object of interest is a hand, the binary image may be a binary skin image detecting skin within the field of view, as represented by the pixels corresponding to the hand, and disregarding other elements present within the field of view of the video stream.

The binary image may be generated without presentation within the video game application. In these embodiments, the video modification system 160 processes the video stream to identify the object of interest in real time while receiving the video stream, including identifying pixels corresponding to the object of interest and generating binary images from frames within the video stream.

In operation 330, the identification component 220 identifies a portion of the object of interest. The portion of the object of interest identified may be a portion of the object of interest which extends from another portion of the object of interest. In some embodiments, the portion of the object of interest is a finger of the portion of the hand. The identification component 220 may identify the portion of the object of interest using edge detection or matching, such as Canny edge detection; feature based object recognition, such as scale-invariant feature transform (SIFT) or speeded up robust features (SURF); or other suitable object recognition processes, operations, or algorithms. The identification component 220 may identify the portion of the object using one or more object recognition processes on one or more of the frames (e.g., images) of the video stream, the pixels identified as corresponding to the object of interest, and the binary image produced from a frame, by the binarization component 260, using the color profile and the pixels corresponding to the object of interest.

Where the portion of the object of interest is a finger, the identification component 220 identifies a finger position of the portion of the hand. The finger position may be identified based on the pixels corresponding to the portion of the hand or the binary image produced from the frame using the pixels corresponding to the portion of the hand. To identify a finger position, the identification component 220 may form a convex polygon encompassing at least a part of the portion of the hand.

In some instances, the identification component 220 generates the convex polygon by generating a contour line encompassing at least a portion of the portion of the hand and the finger. The identification component 220 identifies a set of vertices within the contour line. In some embodiments, a vertex may be indicated by a change in direction of the contour line. A change in direction of the contour line may be identified as a point or set of points at which the contour line changes direction or forms an angle exceeding a predetermined angle threshold. The angle threshold may be represented by a vertex along the contour line having an angle of greater than one degree to ten degrees, indicating a change from 180 degrees to between 179-170 degrees or smaller. In some instances, the angle threshold is a point or set of points representing a vertex in the contour line having an angle greater than ninety degrees.

In some embodiments, the identification component 220 identifies vertices proximate to or at edge pixels along contours of the hand, indicated by the intersection of white and black pixels within the binary images. A first portion of the set of vertices may be identified proximate to or along the contour line. In some instances, one or more of the vertices (e.g., a second portion of the set of vertices) identified occur a distance away from the contour line.

After forming the convex polygon and identifying the set of vertices, the identification component 220 identifies one or more defects within the convex polygon. In some instances, a defect indicates a space between two fingers located on the portion of the hand. The defects may be identified as the second portion of the set of vertices positioned a distance away from the contour line of the convex polygon. The identification component 220 may determine that a vertex is a defect within the convex polygon by determining an angle between two vertices located along the contour line and the vertex being tested as a defect. The angle between the vertices and the defect vertex may be measured as an angle formed between a first line extending between a first vertex located on the contour line and the defect vertex and a second line extending between a second vertex located on the contour line and the defect vertex.

The identification component 220 may identify a defect vertex where the angle is greater than a defect angle threshold. For example, in some instances the defect angle threshold may be set at fifty degrees, at eighty degrees, at ninety degrees, or values therebetween. Where the angle exceeds the defect angle threshold, the identification component 220 may disregard the vertex as a defect. In some instances, where the angle is less than the defect angle threshold, the identification component 220 may determine that the vertex positioned a distance away from the contour line of the convex polygon is a point between two fingers on the portion of the hand.

In some instances, once the identification component 220 identifies the one or more defects, the identification component 220 identifies a vertex connection extending between a vertex along the contour line and a vertex (e.g., a vertex not identified as a defect) positioned a distance away from the contour line. The vertex connection may be represented by a line extending between the two vertices. In some instances, the identification component 220 identifies two vertex connections, a first vertex connection between a vertex along the contour line and a first vertex positioned a distance from the contour line and a second vertex connection between the vertex along the contour line and a second vertex positioned a distance from the contour line and a distance from the first vertex. In these instances, the first vertex connection and the second vertex connection join at the vertex positioned along the contour line. The combination of the first vertex connection and the second vertex connection may generate a chevron. The chevron may extend between a point at or proximate to a tip of the finger and connection points between adjacent fingers. Where the identification component 220 generates the chevron, the chevron may approximate the position of the finger.

In embodiments where the video modification system 160 is part of the video game application, the operation 330 may identify a finger extending from a portion of a hand within one or more frames of the video stream. The hand and finger may be identified and tracked for use as an input or control for the video game application. In some instances, the hand is positioned within a predetermined portion of the one or more frames, such that positioning the hand in the predetermined portion enables identification of the hand and the finger.

In operation 340, the direction component 230 determines a direction of the portion of the object of interest. Where the portion of the object of interest is a finger, the direction component 230 determines the direction of the finger based on the finger position. The direction component 230 may determine the direction of the portion of the object of interest based at least in part on the position of the object of interest determined in operation 330. In some example embodiments, the direction component 230 identifies points along or within the portion of the object of interest relative to the position and an orientation of the portion of the object of interest to identify a direction for the portion of the object of interest. The direction component 230 may determine the direction of the portion of the object of interest based at least in part on the pixels identified as corresponding to the object of interest. In some instances, the direction of the portion of the object of interest is determined using two or more pixels or points selected among the pixels corresponding to the object of interest.

In some example embodiments, the direction component 230 determines the direction of the portion of the object of interest by identifying a first point and a second point on the portion of the object of interest. For example, the direction component 230 may identify a tip of a finger depicted on a portion of the hand. The tip may represent a first point for the finger. The direction component 230 then identifies a second point on the finger. The second point may be spaced a distance from the first point along the finger depicted within the field of view. In some instances, the second point may be selected from among the pixels corresponding with the finger. The second point may be selected from among the pixels of the finger based on the position of the finger determined in operation 330. For example, the second point may be selected as a pixel positioned at a median position within the finger with respect to a thickness of the finger as represented by pixels within the field of view. This way, the first point, located at the tip of the finger, and the second point, located in the middle of the finger with respect to a width of the finger, may be used to determine the direction of the finger. In some instances where the first vertex connection and the second vertex connection are determined, the second point may be selected as a pixel spaced between the first vertex connection and the second vertex connection. The distance between the first vertex connection and the second vertex connection may be determined so as to align the second point at a median position with respect to a thickness of the finger as represented by pixels within the field of view.

In some instances, the direction component 230 generates a direction line extending between the first point and the second point. The direction line may be represented as a vector extending between two points in the field of view and indicating a point of aim within the field of view separated a distance from the first point in the direction line (e.g., vector). The first point and the second point may be associated with relative positions along the finger such that changes in position, direction (e.g., along an x and y axis of the display device), and three dimensional direction (e.g., along a z axis extending inwardly and outwardly from the display device) adjust the point of aim of the finger along the field of view. For example, where the position of the first point shifts a number of pixels to the right along the x axis of the display device and the second point remains relatively fixed, the point of aim may be adjusted to the right with little to no change in the position of the point of aim along the y axis. By way of further example, where the position of the first point shifts downwardly along the y axis and the position of the second point shifts upwardly along the y axis, the point of aim may be adjusted along the z axis to indicate aiming at a point depicted within a background of the field of view presented on the display device.

Where the direction component 230 generates a direction for a finger extending distally from a hand within the video game application, the direction component 230 may identify the direction with respect to the x and y axis of the frame or the display device of a client device. The z axis corresponds to a depth determined for the direction. In these instances, the direction component 230 may identify a point of aim of the finger within the frame in a simulated three dimensional matrix. By determining the direction in the simulated three dimensional matrix, the direction component 230 enables movement of the finger to provide user control of the video game environment depicted in the frames of the video stream. For example, movement of the finger across frames of the video stream may cause the direction component 230 to recalculate the direction of the finger. Movement of the finger and modification of the point of aim may additionally cause the video game application to generate or render interactive elements within the frame such as targets, monsters, aliens, and other objects with which the user may interact using the generated point of aim from the finger.

In some embodiments, the direction component 230 determines the direction of the portion of the object of interest using the first vertex connection and the second vertex connection. In these instances, the direction component 230 uses the positions and the relative positions of the first vertex and the second vertex spaced a distance from the contour line along with the vertex positioned on the contour line to form a chevron (e.g., a shape formed by an angled link between the first vertex connection and the second vertex connection). The chevron and the associated vertices forming the points of the chevron may be used to calculate the direction of the finger and the point of aim. As described above, the relative motions of the vertex along the contour line and the first and second vertices spaced a distance from the contour line along the x, y, and z axes may cause adjustments in the point of aim along the x, y, and z axes as presented on the field of view by the display device.

The direction component 230 may perform one or more operations to ensure smooth tracking, translation, and modification of the portion of the object of interest. In some embodiments, the direction component 230 determines a direction of the portion of the object of interest (e.g., the finger of the portion of the hand within the field of view) for each frame of the video stream. Using the direction determined for each frame, the direction component 230 may determine, for a given or current frame within the video stream, a direction of the portion of the object of interest for each frame of a set of previous frames of the one or more images (e.g., frames of the video stream). In some instances, the direction component 230 may maintain a direction buffer including directional information (e.g., the vector) determined in each frame as a new frame of the video stream is received by the access component 210.

Once the direction component 230 has populated the direction buffer with direction (e.g., vector) information for a predetermined number of frames of the set of previous frames, the direction component 230 combines the direction information of the portion of the object of interest for at least a portion of the set of previous frames to identify an aggregate direction of the portion of the object of interest. For example, where the portion of the object of interest is a finger of the portion of the hand depicted in the field of view and the direction buffer includes vector information for the finger as determined for the set of previous frames, the direction component 230 may identify the aggregate direction of the finger in order to average direction changes determined due to movement of the finger. By averaging the direction changes, the direction component 230 may eliminate artifacts, jitter, or other erroneous finger directions identified in a single frame of the video stream.

The predetermined number of frames may be initially set, for example at three to seven frames within the video stream. In some instances, the number of frames used within the smoothing and tracking operations may be dynamically changed in response to a determination of the direction component 230. For example, upon movement of the finger, the direction component 230 may determine that a distance of movement by the finger between frames of the video stream is sufficient to cause jitter, artifacts, or other unwanted signals. The direction component 230 may increase the number of frames used in the smoothing and tracking operations. Where the direction component 230 determines that the number of frames is greater than a minimum number used to smooth and track the movement of the finger or portion of the object of interest and may impact memory or other resource consumption of the client device 110, the direction component 230 may reduce the number of frames across which movement is averaged, to reduce resource consumption for smoothing and tracking operations within the client device 110.

In operation 350, the modification component 240 replaces at least a portion of the object of interest with a graphical interface element aligned with the direction of the portion of the object of interest. Alignment of the graphical interface element with the direction of the portion of the object of interest (e.g., the direction of the finger) may be achieved by the modification component 240 positioning a distal end of the graphical interface element proximate to a distal end of the portion of the object of interest (e.g., the finger). For example, a muzzle of a blaster (e.g., graphical interface element) may be positioned at or proximate to the first point of the direction line or the vertex on the contour line and aligned such that a simulated point of aim of the blaster is positioned at or proximate to the point of aim of the portion of the object of interest.

Where the portion of the object of interest is a finger, the modification component 240 replaces at least a portion of the hand or the finger with the graphical interface element aligned with the direction of the finger. For example, the graphical interface element may be a representation of a spray paint canister. The modification component 240 may modify the portion of the hand by rendering the spray paint canister in the hand with a nozzle of the spray paint canister aligned with the direction of the finger, such that the point of aim of the spray paint canister is proximate to the point of aim of the finger. In some embodiments, the modification component 240 may modify the portion of the hand by replacing the hand depicted within the field of view with a graphical representation of a hand holding a spray paint canister.

In some embodiments, the graphical interface element may be a weapon (e.g., a firearm, a laser gun, a blaster, an energy weapon, a club, a spear, a knife). The modification component 240 modifies the portion of the hand by rendering the weapon in the hand with an offensive end of the weapon (e.g., a firearm muzzle, a knife blade point, a head of a club) aligned with the direction of the finger. In some instances, the modification component 240 modifies the portion of the hand by replacing the hand depicted within the field of view with the graphical interface element of the weapon, a portion of the graphical interface element, or a portion of the graphical interface element depicting a representation of at least a portion of a hand.

In some embodiments, prior to the modification component 240 replacing the portion of the object of interest, the binarization component 260 generates one or more binary images by isolating the pixels corresponding to the object of interest. The binarization component 260 may isolate the pixels by converting the pixels corresponding to the portion of the object of interest to a first value and the remaining pixels within the field of view to a second value.

Figure 4:
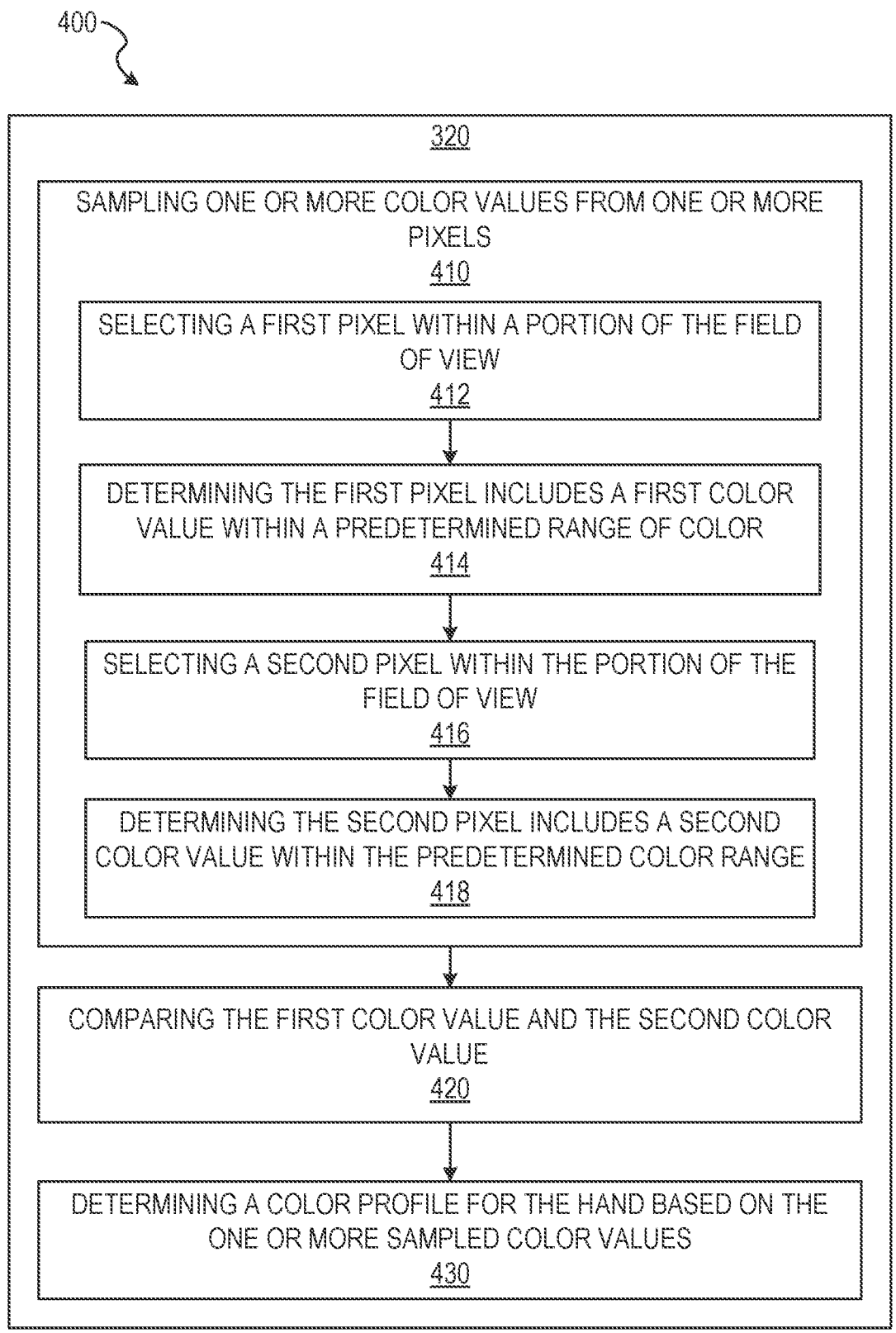
FIG. 4 is a flow diagram illustrating an example method for segmenting portions of a video stream and modifying portions of the video stream based on the segmentation, according to some example embodiments.

FIG. 4 shows a flow diagram illustrating an example method 400 for segmenting portions of a video stream and modifying portions of the video stream (e.g., representations or depictions of the object of interest) based on the segmentation. The operations of the method 400 may be performed by components of the video modification system 160. In some instances, certain operations of the method 400 may be performed using one or more operations of the method 300 or as sub-operations of one or more operations of the method 300, as will be explained in more detail below. For example, as shown in FIG. 4, the operations of the method 400 may represent a set of sub-operations of the operation 320.

In operation 410, the identification component 220 samples one or more color values from one or more pixels within the portion of the field of view of the image capture device. In some embodiments, the identification component 220 determines the pixels corresponding to the object of interest (e.g., the portion of the hand) by sampling one or more color values from one or more pixels within the portion of the field of view of the image capture device. The identification component 220 may sample the one or more color values by identifying a subset of pixels located within a predetermined portion of the field of view of a frame of the video stream.

The identification component 220 may select a predetermined number of pixels for sampling color values. In some embodiments, the identification component 220 selects pixels for sampling of color values until an average change in color value between pixels already sampled and a newly sampled pixel falls below a predetermined color variation threshold. The identification component 220 may perform one or more operations or sub-operations to sample the one or more color values from the one or more pixels within the portion of the field of view, as described in more detail below.

In some embodiments, operation 410 is performed by the identification component 220 selecting a first pixel within the portion of the field of view in operation 412. The identification component 220 may select the first pixel from within the portion of the field of view at random. In some instances, the identification component 220 selects the first pixel at a predetermined position within the portion of the field of view. Although specified methods of selecting the first pixel are presented here, it should be understood that the identification component 220 may select the first pixel using any suitable method.

In operation 414, the identification component 220 determines that the first pixel includes a first color value within a predetermined range of color values. The expected color range may be selected based on an expected object of interest. For example, where the object of interest expected is a hand of a user, the expected color range includes color values associated with human skin colors. In some instances, after selecting the first pixel and determining that the color value is within an expected color range for the object of interest, the identification component 220 refines the color range from a first color range to a second color range. The second color range may be a portion of the first color range. For example, where the first color range includes color values associated with human skin, the second color range may include a subset of color values associated with human skin. The second color range may narrow the expected color range to a range of color values associated with a subset of human skin more closely related to the color value of the first pixel.

In operation 416, the identification component 220 selects a second pixel within the portion of the field of view. The second pixel may be spaced a distance away from the first pixel and remain within the portion of the field of view. The second pixel may be selected similarly to or the same as the first pixel in operation 412. In some instances, the second pixel is selected by the identification component 220 based on the position of the first pixel. In these embodiments, the second pixel may be selected a predetermined distance from the first pixel within the portion of the field of view. For example, the second pixel may be selected a distance of between one and one hundred pixels away from the first pixel, so long as the distance between the first pixel and the second pixel does not place the second pixel outside of the portion of the field of view.

In operation 418, the identification component 220 determines that the second pixel includes a second color value within the predetermined range of color values. Determining that the second pixel includes the second color value in the range of color values may be performed similarly to or the same as determining that the first pixel includes the first color value within the range of color values in operation 414, described above.

In operation 420, the identification component 220 compares the first color value and the second color value to determine that the second color value is within a color threshold of the first color value. In some embodiments, the color threshold is a value placing both the first color value and the second color value in the predetermined range of color values into which the identification component 220 determines the first color value is included. In these instances, the color threshold may be dynamically determined based on the first color value and the predetermined range of color values, such that the second color value is acceptable if the second color value falls within the predetermined range of color values (e.g., a predetermined threshold). In some example embodiments, the color threshold may be a predetermined color threshold. In these instances, the second color value may be discarded and the second pixel reselected where the second color value falls outside of the predetermined color threshold despite being within the predetermined color range.

In operation 430, the identification component 220 determines a color profile for the hand (e.g., the object of interest) based on the one or more color values sampled (e.g., the first color value and the second color value) from the one or more pixels (e.g., the first pixel and the second pixel). The identification component 220 includes the first color value and the second color value in the color profile for the hand based on the second color value being within the predetermined color threshold. The color profile represents a median color value of the hand. The median color value may be a single color value, such as a midpoint of the color values sampled by the identification component 220, or a range of color values, such as a range of color values including the color values sampled by the identification component 220.

In some embodiments, after the identification component 220 samples the one or more colors and determines the color profile, the identification component 220 may identify the pixels within the predetermined portion of the field of view which have a color value associated with the color profile. The identification component 220 may determine that a pixel has a color value associated with the color profile by identifying the color value of the pixel as being within a predetermined range of the median color value (e.g., a single median color value) or within the range of color values within the color profile. The identification component 220 may identify the pixels associated with the color profile in the predetermined portion of the field of view for each frame of the video stream.

In some instances, in response to identifying the pixels associated with the color profile, the binarization component 260 extracts the object of interest by computing a binary image for the object of interest. In the binary image computed by the binarization component 260, pixels associated with the color profile may be assigned a first value and the remaining pixels within the field of view may be assigned a second value. For example, the first value may be a one, indicating a white pixel, and the second value may be a zero, indicating a black pixel. The binarization component 260 may also filter the binary image of each frame with a nonlinear median blur filter to remove artifacts, inclusions, or other erroneous pixel conversions.

In some embodiments, the identification component 220 determines the color profile by generating a histogram from the one or more color values sampled from within the portion of the field of view. The histogram may represent a distribution of pixels having specified color values among the pixels sampled by the identification component 220. The histogram may be a color histogram generated in a three-dimensional color space such as red, green, blue (RGB); hue, saturation, lightness (HLS); and hue, saturation, value (HSV), among others. The histogram may be generated using any suitable frequency identification operations or algorithms capable of identifying, from among the selected and color-sampled pixels, a frequency of a color value occurring among the pixels.

In some instances, the histogram may be a two dimensional histogram. The two dimensional histogram may identify combinations of intensities or values and a number of pixels having the identified combination of intensities or values. In some example embodiments, the histogram, generated as a two dimensional histogram, identifies combinations of a hue value and a color saturation value for pixels having specified color values identified during color sampling. The hue and color saturation values may be extracted from the HSV color space.

In response to generating the histogram, the identification component 220 removes one or more bins of the histogram below a predetermined pixel threshold. The bins of the histogram may be understood as a set of divisions within the histogram. Each bin may represent a color value among the color values sampled from the selected pixels or among the pixels within the portion of the field of view. The bin may indicate a value for a number of pixels associated with or depicting the specified color value for the bin. In embodiments where the histogram is a two dimensional histogram, the bins of the histogram indicate hue and color saturation values as well as the number of pixels having the hue and color saturation values. The bins, in these embodiments, with the largest number of pixels associated with the hue and color saturation values of the color profile are associated with the object of interest (e.g., the hand).

The predetermined pixel threshold is a threshold for estimating pixels associated with the object of interest or unassociated therewith. The predetermined pixel threshold may be applied to bins of the histogram such that bins having a number of pixels above the predetermined pixel threshold are estimated or determined to be associated with the object of interest. The bins having the number of pixels above the predetermined pixel threshold may be associated with color values within the expected color range identified for the object of interest. The predetermined pixel threshold may be a percentage value, such as a percentage of a total number of pixels within the portion of the field of view which are included in a specified bin. For example, the predetermined pixel threshold may be five, ten, or fifteen percent of the total pixels within the portion of the field of view. In this example, a bin containing fewer than five, ten, or fifteen percent, respectively, of the total pixels may be determined to contain pixels unassociated with the object of interest. In some instances, the predetermined pixel threshold is a number value of pixels occurring within the bin. For example, the predetermined pixel threshold may be between 1,000 and 200,000 pixels. In this example, a bin having fewer than 1,000 pixels or 200,000 pixels, respectively, may be determined to contain pixels unassociated with the object of interest.

The identification component 220 includes color values in the color profile which are associated with bins having a number or percentage of pixels above the predetermined pixel threshold. In some instances, where the binarization component 260 generates a binary image, the binarization component 260 converts the color values for pixels in bins exceeding the predetermined pixel threshold to the first value, indicating a white pixel representing a portion of the object of interest. The binarization component 260 may convert color values for pixels in bins below the predetermined pixel threshold to the second value, indicating a black pixel unassociated with the object of interest.

Figure 5:
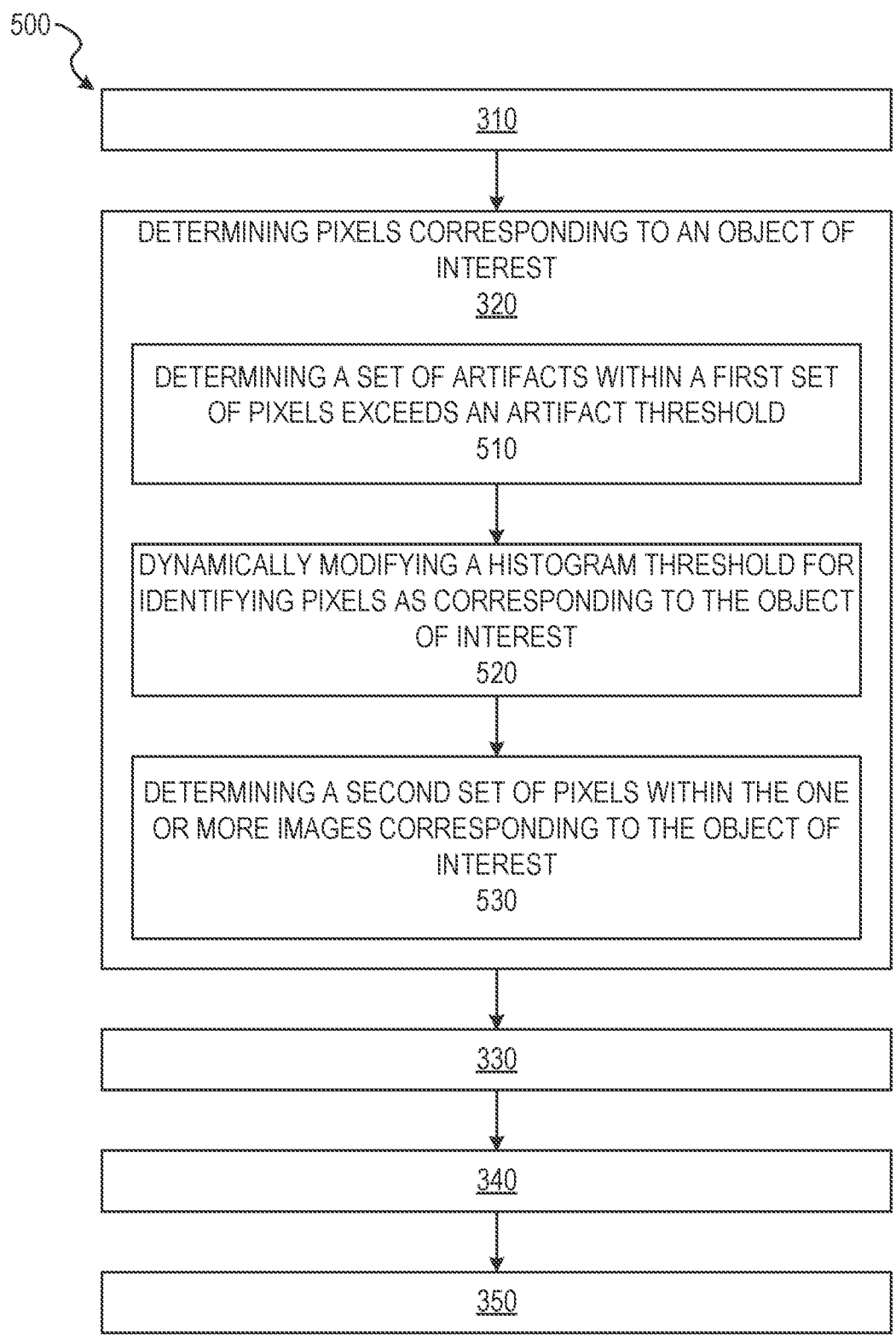
FIG. 5 is a flow diagram illustrating an example method for segmenting portions of a video stream and modifying portions of the video stream based on the segmentation, according to some example embodiments.

FIG. 5 shows a flow diagram illustrating an example method 500 for segmenting portions of a video stream and modifying portions of the video stream (e.g., representations or depictions of the object of interest) based on the segmentation. The operations of the method 500 may be performed by components of the video modification system 160. In some instances, certain operations of the method 500 may be performed using one or more operations of the methods 300 or 400 or as sub-operations of one or more operations of the methods 300 or 400, as will be explained in more detail below. For example, as shown in FIG. 5, the operations of the method 400 may represent a set of sub-operations of the operation 320.

In operation 510, the identification component 220 determines that a set of artifacts within a first set of pixels exceeds an artifact threshold. In some embodiments, the first set of pixels is determined by the identification component 220 in operation 320, described above. The first set of pixels may correspond to the portion of the object of interest (e.g., a finger on a portion of a hand). In some instances, the first set of pixels may correspond to the entire object of interest as identified by the identification component 220.

In some instances, the artifact threshold is a number of pixels or pixel regions, within a convex polygon, which have a value different than pixels or pixel regions surrounding the artifact. For example, where the convex polygon is identified and a binary image is generated, the artifacts may be pixels or pixel regions within the convex polygon which have a value of zero (e.g., black pixels) and are depicted on the object of interest.

Although described as artifacts within the first set of pixels, the artifacts may be identified outside of the first set of pixels. In some instances artifacts may be pixels or pixel regions outside of the convex polygon which have a value substantially different from values for surrounding pixels or pixel regions. For example, an artifact outside of the convex polygon may be a pixel or pixel region having a value of one (e.g., a white pixel) outside one or more of the convex polygon or the object of interest.

To determine that the set of artifacts exceeds the artifact threshold, the identification component 220 may identify a total number of pixels included among the set of artifacts and determine that the total pixel count exceeds a total pixel count of the artifact threshold. In some instances, the identification component 220 identifies a number of artifacts (e.g., discrete groupings of pixels having similar values surrounded by pixels having substantially different values) and determines that the identified number of artifacts exceeds a total number of artifacts calculated as the artifact threshold.

In operation 520, the threshold component 250 dynamically modifies a histogram threshold for identifying pixels as corresponding to the portion of the object of interest. In some embodiments, the threshold component 250 dynamically modifies the histogram threshold based on the direction of the portion of the object of interest (e.g., the finger). In some embodiments the histogram threshold is the predetermined color threshold. Adjustment of the histogram threshold may increase or reduce the predetermined color threshold to include a greater or lesser number of color values within the color threshold and the histogram threshold. In some instances the histogram threshold is associated with the predetermined pixel threshold. Modification of the histogram threshold may increase or reduce the predetermined pixel threshold to include color values, as part of the object of interest or color profile, which are associated with a greater or lesser number of pixels.

In response to determining that the artifacts exceed the artifact threshold, the threshold component 250 or the identification component 220 may determine one or more color values for pixels adjacent or proximate to one or more of the artifacts. In some embodiments, the threshold component 250 or the identification component 220 determines a position of the one or more color values within the histogram. The threshold component 250 or the identification component 220 may also determine the position of the one or more color values with respect to the predetermined color range. Based on the position of the one or more color values, the threshold component 250 modifies the histogram threshold to include additional color values associated with the one or more colors of the adjacent or proximate pixels. For example, where the identification component 220 or the threshold component 250 identifies one or more color values for one or more pixels adjacent or proximate to an artifact which are positioned at a low end of the color threshold or the pixel threshold in the histogram, the threshold component 250 may increase the low end of the color threshold or pixel threshold to include one or more colors or one or more pixels, previously excluded from the low end of the color threshold or the pixel threshold.

In operation 530, the identification component 220 determines a second set of pixels within the one or more images corresponding to the object of interest (e.g., the hand or portion of the hand) depicted within the field of view. The second set of pixels is determined based on the modified histogram threshold. In some embodiments, the second set of pixels includes at least a portion of the first set of pixels. Operation 530 may be performed similarly to or the same as operation 320, described above with respect to FIG. 3.

Figure 6:
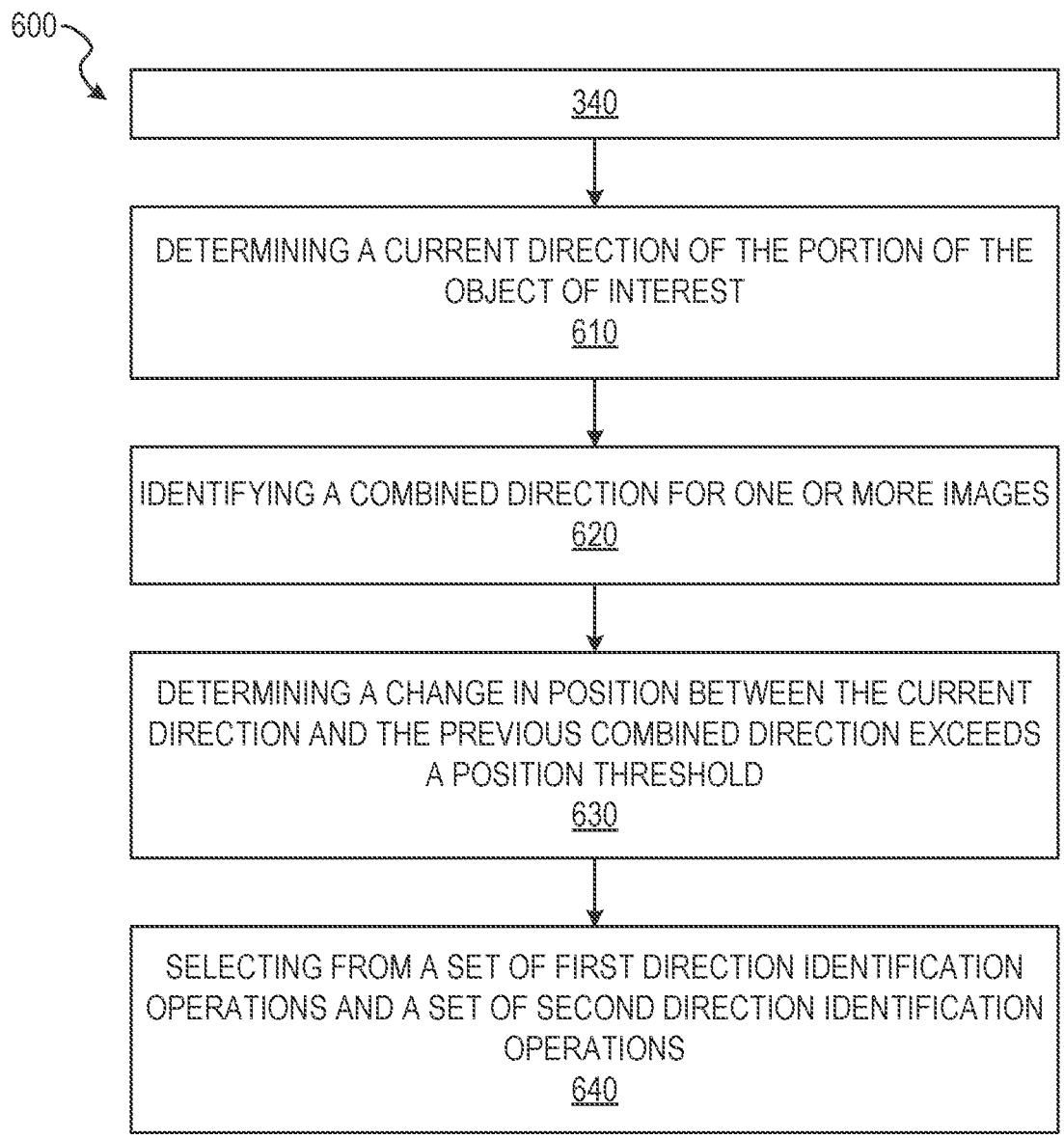
FIG. 6 is a flow diagram illustrating an example method for segmenting portions of a video stream and modifying portions of the video stream based on the segmentation, according to some example embodiments.

FIG. 6 shows a flow diagram illustrating an example method 600 for segmenting portions of a video stream and modifying portions of the video stream (e.g., representations or depictions of the object of interest) based on the segmentation. The operations of the method 600 may be performed by components of the video modification system 160. In some instances, certain operations of the method 600 may be performed using one or more operations of the methods 300, 400, or 500 or as sub-operations of one or more operations of the methods 300, 400, or 500, as will be explained in more detail below. For example, the operations of the method 600 may represent a set of operations performed in response to performance of operation 340.

In operation 610, the direction component 230 determines a current direction of the portion of the object of interest (e.g., the finger depicted on the portion of the hand) from a specified corner of the field of view. The specified corner may be a predetermined corner, edge, set of pixels, pixel, coordinate, or other portion of the field of view. For example, in some embodiments, the specified corner may be presented as a lower left hand corner of the field of view as presented on a display device of the client device 110. In some embodiments, operation 610 is performed similarly to or the same as operation 340.

In operation 620, the direction component 230 identifies a combined direction of the portion of the object of interest for one or more images (e.g., the set of previous frames of the video stream) to indicate a previous combined direction. In some embodiments, the direction component 230 identifies the combined direction of the portion of the object of interest for three or more previous frames of the video stream. The direction component 230 identifies one or more directions for the portion of the object of interest determined for each of the one or more images. The direction component 230 may average the one or more directions of the one or more images. In some instances, the direction component 230 averages the one or more directions by generating an average of one or more vectors representing the one or more directions. The direction component 230 may generate a weighted moving average of the one or more directions where two or more of the directions or vectors are proximate to one another. In some embodiments, the weighted moving average places a greater weight on a direction determined for a frame immediately preceding the current frame and the currently identified direction.

In operation 630, the direction component 230 determines that a change in position between the current direction and the previous combined direction exceeds a position threshold. The direction component 230 may determine that the change in position exceeds the position threshold by comparing the combined direction and the current direction to determine the change in position. The change in position may be measured in pixels, degrees, radians, or any other suitable measurement extending between two directions, vectors, or points along a direction line. In response to measuring the change in position, the direction component 230 may compare the measurement to the position threshold. The position threshold may be a radian value, a degree value, a pixel value, or another threshold value. Where the change in position is below the position threshold, the direction component 230 may disregard the combined direction of the previous frames.

In operation 640, the direction component 230 selects from a set of first direction identification operations and a set of second direction identification operations based on the change in position exceeding the position threshold. The set of first direction identification operations includes one or more threshold modification operations. The set of second direction identification operations includes determining a direction from two or more of the current frame and the previous frames.

In some embodiments, the first direction identification operations modify one or more of the histogram threshold, the color profile, or the pixel threshold. The direction component 230, alone or in combination with one or more of the threshold component 250 and the identification component 220, may modify the histogram threshold, the color profile, or the pixel threshold in a manner similar to that described above with respect to FIGS. 3-5. In some instances, in response to determining that the change in position exceeds the position threshold, the direction component 230 may identify color values for pixels associated with points on the direction line in the present frame and in one or more previous frames. The direction component 230 may also identify color values for pixels or pixel clusters adjacent to or proximate to the points on the direction line. Where the direction component 230 determines that the color values of the pixels adjacent or proximate to the points on the direction line are not associated with the color profile or color values within the histogram associated with a number of pixels above the pixel threshold, the direction component 230 may disregard the direction of the present frame. In these instances, the direction component 230 may revert to the direction in the previous frame. The direction component 230 may also recalculate the direction of the direction line by identifying points on the portion of the object of interest and generating a new direction line or vector. In some embodiments, the direction component 230, the threshold component 250, or the identification component 220 may modify the one or more of the histogram threshold, the color profile, or the pixel threshold to remove artifacts or false positive pixel identifications outside of one or more of the object of interest and the convex polygon. For example, modification of one or more of the histogram threshold, the color profile, or the pixel threshold may cause a resulting binary image to present fewer artifacts having the first pixel value (e.g., a value of one indicating a white pixel) where the frame is captured in a dark room or using a sub-optimal International Organization for Standardization (ISO) speed or aperture size (e.g., focal ratio, f-ratio, or f-stop).

In some instances, the set of second direction identification operations causes the direction component 230, alone or in combination with the identification component 220 or the threshold component 250, to modify a prior frame threshold. The prior frame threshold represents a number of prior frames of the video stream which are used to calculate the average direction or weighted moving average for the direction of the portion of the object of interest. In some embodiments, the direction component 230 initially calculates the average direction using directions calculated for the three frames immediately preceding the current frame of the video stream. Where the change in position exceeds the position threshold, the direction component 230 modifies the prior frame threshold to include one or more additional frames and recalculates the average direction. Where the modification of the prior frame threshold causes the change in position to fall within the position threshold, the direction component 230 may continue identifying changes in direction in additional frames using the modified prior frame threshold.

In some embodiments, the direction component 230 identifies that the changes in direction across a set of prior frames of the video stream indicate motion above a predetermined motion threshold for the object of interest or the portion of the object of interest. In these instances, the direction component 230 terminates or interrupts calculation of the average direction and use of prior frame thresholds. In response to interruption of use of prior frame thresholds or determination of motion exceeding the motion threshold, the direction component 230 determines a change in angle of the direction line or the vector along with a change in position of the direction line or vector, or one or more points along the direction line or vector. In response to one or more of the change in position and the change in angle of the direction line or vector exceeding a modified position threshold or an angle threshold, the direction component 230 may modify or discard the change in position or change in angle. Where the direction component 230 modifies the change in position or change in angle, the direction component 230 may average the change in position or the change in angle with the position or angle in one or more prior frames and use the averaged position or averaged angle as the position or angle of the current frame. Where the direction component 230 discards the change in position or change in angle, the direction component 230 may substitute the position or angle of the previous frame with the position or angle of the current frame.

Figure 7:
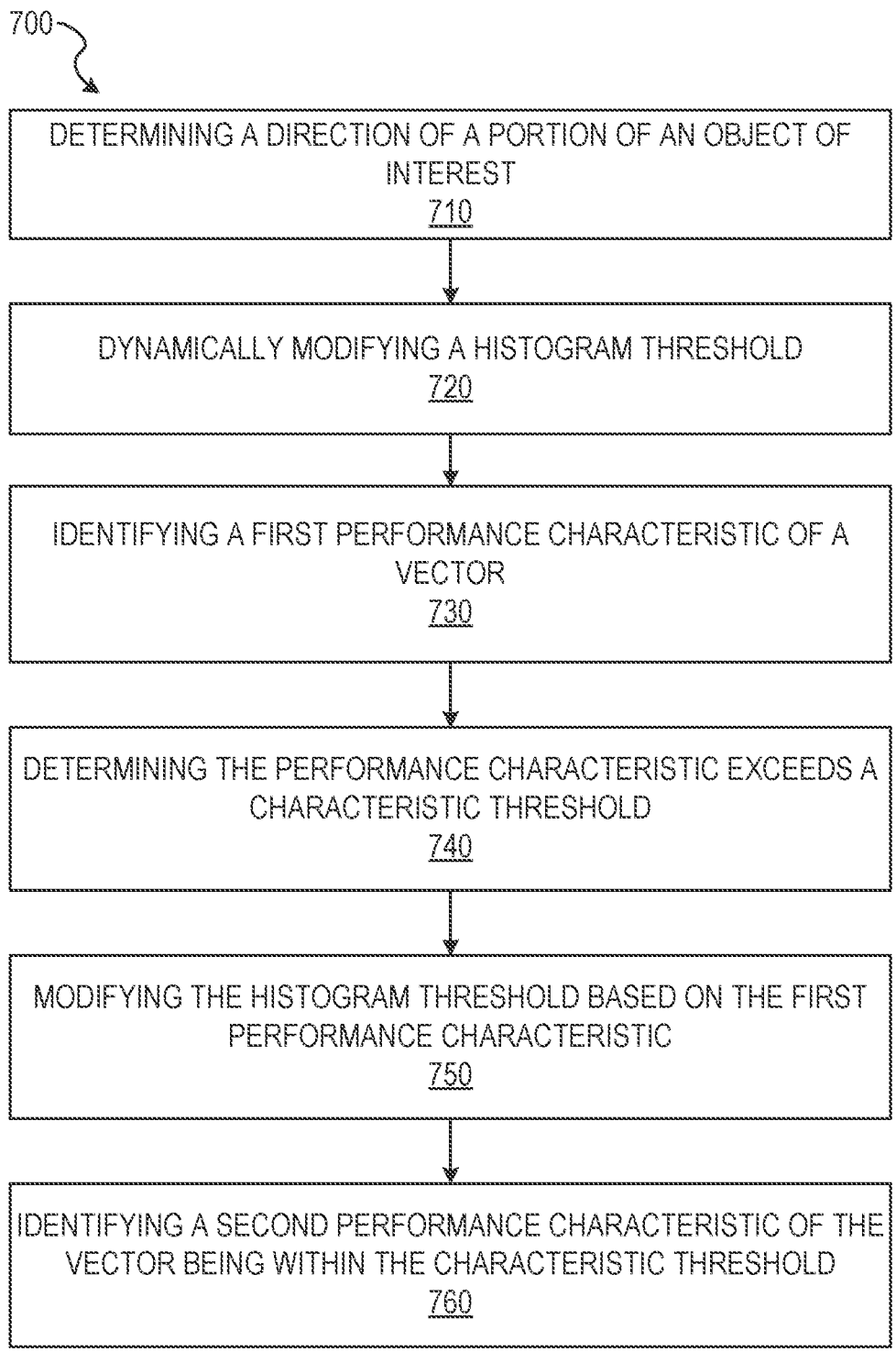
FIG. 7 is a flow diagram illustrating an example method segmenting portions of a video stream and modifying portions of the video stream based on the segmentation, according to some example embodiments.

FIG. 7 shows a flow diagram illustrating an example method 700 for segmenting portions of a video stream and modifying portions of the video stream (e.g., representations or depictions of the object of interest) based on the segmentation. The operations of the method 700 may be performed by components of the video modification system 160. In some instances, certain operations of the method 700 may be performed using one or more operations of the methods 300, 400, 500, or 600 or as sub-operations of one or more operations of the methods 300, 400, 500, or 600, as will be explained in more detail below. For example, the operations of the method 700 may represent a set of operations performed in response to performance of one or more of operations 320, 330, or 340.

In operation 710, the direction component 230 determines a direction of the portion of the object of interest. Where the portion of the object of interest is a finger, the direction component 230 determines the direction of the finger based on the finger position. The direction of the finger may be represented as a vector extending between two pixels corresponding to the portion of the hand (e.g., positioned along the finger). Operation 710 may be performed similarly to or the same as operation 340, described above with respect to FIG. 3.

In operation 720, the threshold component 250 dynamically modifies a histogram threshold. The threshold component 250 may modify the histogram threshold in response to determining the direction of the portion of the object of interest (e.g., the finger) and determining an error, artifact, or unexpected motion of the object of interest. In some embodiments, operation 720 is performed similarly to or the same as operation 520.

In operation 730, the threshold component 250 identifies a first performance characteristic of the vector. The first performance characteristic may include measurements of a presence of jitter at the object of interest or the direction line (e.g., vector), presence of artifacts on the object of interest, alignment of the graphical interface element with the object of interest, coverage of the object of interest by the graphical interface element, position of the convex polygon, contour dimensions of the convex polygon, contour proportions of the convex polygon, and other suitable performance characteristics. Artifacts may be similar to those described above and occur within the depiction of the object of interest.

The presence of jitter may be represented by a movement from a first position to a second position of one or more points or edges of the object of interest between frames with a subsequent movement from the second position to the first position in a subsequent frame temporally proximate to the initial movement. For example, when the video stream is depicted as a binary image with the object of interest represented using white pixels, jitter may be seen in quick, unsteady or irregular movement within the video stream, often repeating one or more times prior to a subsequent movement.

Alignment of the graphical interface element with the object of interest may be determined based on the direction line or vector for the finger (e.g., portion of the object of interest) and a direction line or vector generated for the graphical interface element. The direction line or vector for the graphical interface element may be generated similarly to or the same as the direction line or vector for the finger, described above. For example, the direction line or vector for the graphical interface element may be generated by selecting two or more points or pixels depicted on the graphical interface element, such as a point proximate to a distal end of the graphical interface element (e.g., a muzzle of a blaster) and a point spaced a distance apart from the distal end and toward a proximal end of the graphical interface element. The angles of the direction lines of the finger and the graphical interface element, with respect to a reference point, may be compared to generate a value for the performance characteristic. For example, the direction component 230 may determine a percentage difference between the angle of the direction line for the finger and the direction line for the graphical interface element, and use the percentage difference as the performance characteristic value.

Coverage of the object of interest by the graphical interface element may be determined by identifying two or more borders for the graphical interface element. The identification component 220 may identify the borders of the graphical interface element as one or more edges of the graphical interface element or one or more edges of an image depicting the graphical interface element. The identification component 220 may determine an amount of the object of interest not covered by the graphical interface element based on portions of the object of interest extending outwardly from the two or more borders of the graphical interface element. The coverage performance characteristic may be given a value such as a percentage of the object of interest covered by the graphical interface element.

Position of the convex polygon may be identified by the identification component 220 determining a boundary of a predetermined portion of the frames. In some instances, the boundary is a rectangular section of each frame of the video stream. The predetermined portion of the frame may be positioned in a lower left corner or side of the frame. The identification component 220 may identify a percentage, amount, or number of points on the contour line, or portion of the contour line which overlaps or extends outwardly from the predetermined portion of the frame. The polygon position performance characteristic may include a value representing whether or how much the convex polygon is in the predetermined portion of the frame.

Contour dimensions of the convex polygon may be identified with respect to the predetermined portion of the frame. In some embodiments, the identification component 220 determines the dimensions of the convex polygon. The dimensions of the convex polygon may include an area (e.g., an area of pixels) occupied by the convex polygon, a shape or set of edges of the convex polygon, or any other suitable dimensions of the convex polygon. The area of the convex polygon may be determined by the number of pixels encapsulated within the convex polygon. In some embodiments, the contour dimensions of the convex polygon are determined as a percentage of the predetermined portion of the frame. The performance characteristic value associated with the contour dimensions may be an area value, a percentage of the predetermined portion of the frame, or any other suitable value describing the contour dimensions.

Contour proportions of the convex polygon may be identified as expected proportion ratios of parts of the convex polygon with respect to other portions of the convex polygon. For example, where the object of interest bounded by the convex polygon is a hand and the portion of the object of interest used for determining a direction of the object of interest is a finger, the contour proportions may fall within an expected proportion ratio of a finger and a hand. The identification component 220 may identify the portion of the object of interest and generate a partition line dividing the portion of the object of interest from the remaining parts of the object of interest. The identification component 220 may then compare the area or other size measurement of the portion of the object of interest to the remaining part of the object of interest to generate a contour proportion.

In operation 740, the threshold component 250 determines that the performance characteristic exceeds a characteristic threshold. The characteristic threshold to which the threshold component 250 compares the performance characteristic value may be specific to the performance characteristic. For example, where the performance characteristic value is a value for the contour dimensions of the convex polygon, the characteristic threshold may be a maximum expected area value or a maximum percentage value for the convex polygon occupying an area of the predetermined portion of the frame. In some instances, the threshold component 250 determines that the performance characteristic exceeds the characteristic threshold by identifying which of the values, performance characteristic or characteristic threshold, is greater. For example, where the performance characteristic is coverage of the object of interest by the graphical interface element, the threshold component 250 may determine that eighty-five percent of the object of interest is covered by the graphical interface element, leaving fifteen percent uncovered. Where the characteristic threshold is five percent uncovered area of the object of interest, the fifteen percent uncovered area exceeds the characteristic threshold.

In operation 750, the threshold component 250 modifies the histogram threshold based on the performance characteristic. The histogram threshold may be modified in a way similar to or the same as that described in operation 520. Modification of the histogram threshold may include or exclude pixels from inclusion in the object of interest or the convex polygon. For example, where the convex polygon has contour dimensions occupying a greater portion of the predetermined portion of the frame than expected by the characteristic threshold, the histogram threshold may be increased to reduce the identified size or dimensions of the convex polygon.

In operation 760, the threshold component 250 identifies that a second performance characteristic of the vector is within the characteristic threshold. The second performance characteristic may be the same performance characteristic as that identified in operation 730, where the performance characteristic value is modified based on the modification of the histogram threshold performed in operation 750. Once the threshold component 250 determines a performance characteristic which is within the characteristic threshold, the video modification system 160 may proceed with operation 350. In some embodiments, after the video modification system 160 completes operation 760 or operation 350, the video modification system 160 may proceed with modification of the next frame within the video stream.

Modules, Components, and Logic

Certain embodiments are described herein as including logic or a number of components, modules, or mechanisms. Modules and components can constitute hardware modules or components. A "hardware module" or "hardware component" is a tangible unit capable of performing certain operations and can be configured or arranged in a certain physical manner. In various example embodiments, one or more computer systems (e.g., a standalone computer system, a client computer system, or a server computer system) or hardware modules or hardware components of a computer system (e.g., at least one hardware processor, a processor, or a group of processors) are configured by software (e.g., an application or application portion) as a hardware module or hardware component that operates to perform certain operations as described herein.

In some embodiments, a hardware module or hardware component is implemented mechanically, electronically, or any suitable combination thereof. For example, a hardware module or hardware component can include dedicated circuitry or logic that is permanently configured to perform certain operations. For example, a hardware module or hardware component can be a special-purpose processor, such as a Field-Programmable Gate Array (FPGA) or an Application Specific Integrated Circuit (ASIC). A hardware module or hardware component may also include programmable logic or circuitry that is temporarily configured by software to perform certain operations. For example, a hardware module or hardware component can include software encompassed within a general-purpose processor or other programmable processor. It will be appreciated that the decision to implement a hardware module or hardware component mechanically, in dedicated and permanently configured circuitry, or in temporarily configured circuitry (e.g., configured by software) can be driven by cost and time considerations.

Accordingly, the phrase "hardware module" or "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" or "hardware-implemented component" refers to a hardware module or hardware component, respectively. Considering embodiments in which hardware modules or hardware components are temporarily configured (e.g., programmed), each of the hardware modules or hardware components need not be configured or instantiated at any one instance in time. For example, where a hardware module or hardware component comprises a general-purpose processor configured by software to become a special-purpose processor, the general-purpose processor may be configured as respectively different special-purpose processors (e.g., comprising different hardware modules or hardware components) at different times. Software can accordingly configure a particular processor or processors, for example, to constitute a particular hardware module or hardware component at one instance of time and to constitute a different hardware module or hardware component at a different instance of time.

Hardware modules or hardware components can provide information to, and receive information from, other hardware modules or hardware components. Accordingly, the described hardware modules or hardware components can be regarded as being communicatively coupled. Where multiple hardware modules or hardware components exist contemporaneously, communications can be achieved through signal transmission (e.g., over appropriate circuits and buses) between or among two or more of the hardware modules or hardware components. In embodiments in which multiple hardware modules or hardware components are configured or instantiated at different times, communications between such hardware modules or hardware components may be achieved, for example, through the storage and retrieval of information in memory structures to which the multiple hardware modules or hardware components have access. For example, one hardware module or hardware component performs an operation and stores the output of that operation in a memory device to which it is communicatively coupled. A further hardware module or hardware component can then, at a later time, access the memory device to retrieve and process the stored output. Hardware modules or hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules or components that operate to perform one or moreoperations or functions described herein. As used herein, "processor-implemented module" or "processor-implemented component" refers to a hardware module or hardware component implemented using processors.

Similarly, the methods described herein can be at least partially processor-implemented, with a particular processor or processors being an example of hardware. For example, at least some of the operations of a method can be performed by processors, processor-implemented modules, or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an API).

The performance of certain of the operations may be distributed among the processors, not only residing within a single machine, but deployed across a number of machines. In some example embodiments, the processors or processor-implemented modules or components are located in a single geographic location (e.g., within a home environment, an office environment, or a server farm). In other example embodiments, the processors or processor-implemented modules or components are distributed across a number of geographic locations.

Applications

Figure 8:
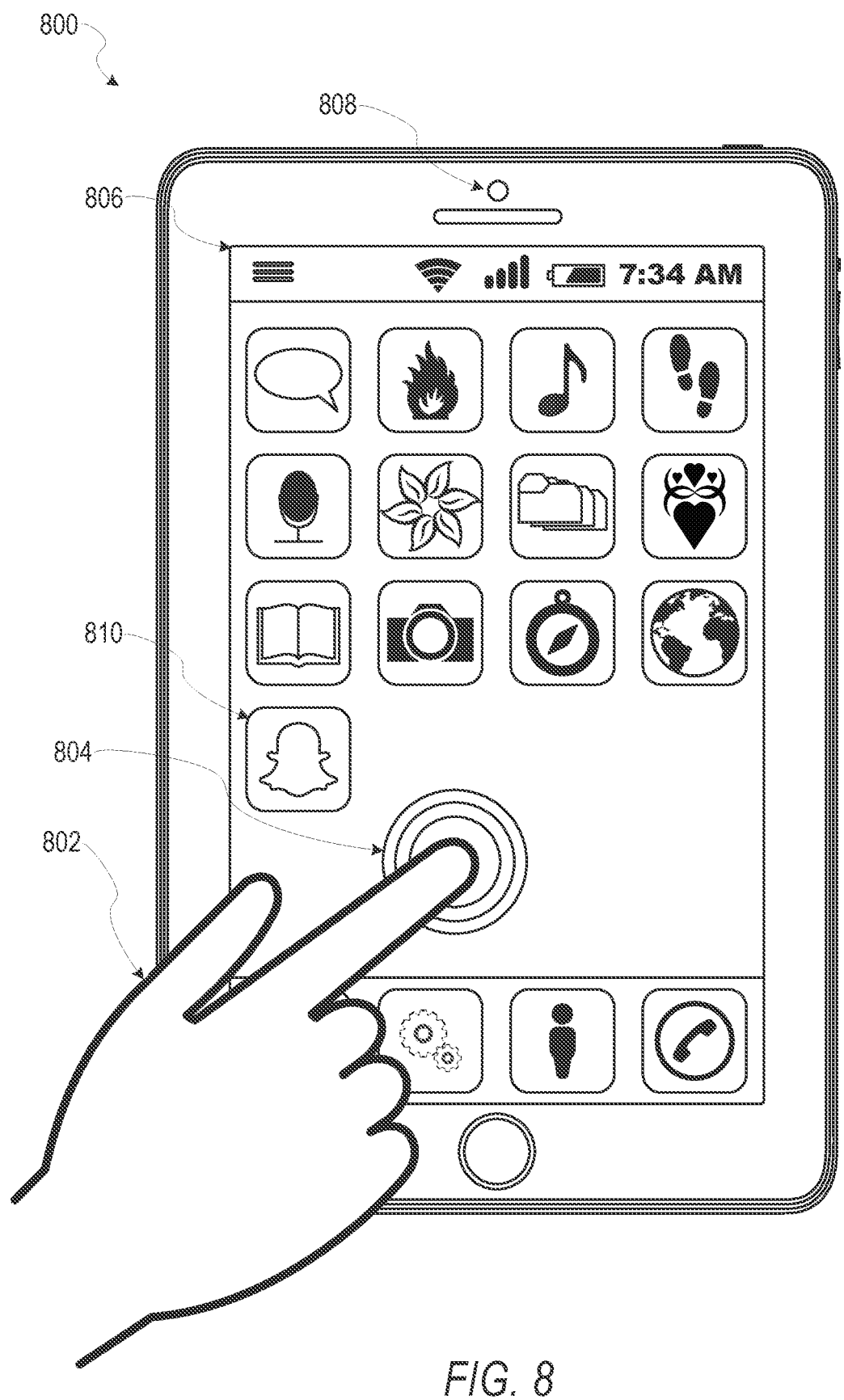
FIG. 8 is a user interface diagram depicting an example mobile device and mobile operating system interface, according to some example embodiments.

FIG. 8 illustrates an example mobile device 800 executing a mobile operating system (e.g., IOS™, ANDROID™, WINDOWS® Phone, or other mobile operating systems), consistent with some embodiments. In one embodiment, the mobile device 800 includes a touch screen operable to receive tactile data from a user 802. For instance, the user 802 may physically touch 804 the mobile device 800, and in response to the touch 804, the mobile device 800 may determine tactile data such as touch location, touch force, or gesture motion. In various example embodiments, the mobile device 800 displays a home screen 806 (e.g., Springboard on IOS™) operable to launch applications or otherwise manage various aspects of the mobile device 800. In some example embodiments, the home screen 806 provides status information such as battery life, connectivity, or other hardware statuses. The user 802 can activate user interface elements by touching an area occupied by a respective user interface element. In this manner, the user 802 interacts with the applications of the mobile device 800. For example, touching the area occupied by a particular icon included in the home screen 806 causes launching of an application corresponding to the particular icon.

The mobile device 800, as shown in FIG. 8, includes an imaging device 808. The imaging device 808 may be a camera or any other device coupled to the mobile device 800 capable of capturing a video stream or one or more successive images. The imaging device 808 may be triggered by the video modification system 160 or a selectable user interface element to initiate capture of a video stream or succession of images and pass the video stream or succession of images to the video modification system 160 for processing according to the one or more methods described in the present disclosure.

Many varieties of applications (also referred to as "apps") can be executing on the mobile device 800, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app 810 such as SNAPCHAT® that, consistent with some embodiments, allows users to exchange ephemeral messages that include media content. In this example, the social messaging app 810 can incorporate aspects of embodiments described herein. For example, in some embodiments the social messaging app 810 includes an ephemeral gallery of media created by users of the social messaging app 810. These galleries may consist of videos or pictures posted by a user and made viewable by contacts (e.g., "friends") of the user. Alternatively, public galleries may be created by administrators of the social messaging app 810 consisting of media from any users of the application (and accessible by all users). In yet another embodiment, the social messaging app 810 may include a "magazine" feature which consists of articles and other content generated by publishers on the social messaging app 810's platform and accessible by any users. Any of these environments or platforms may be used to implement concepts of the present disclosure.

In some embodiments, an ephemeral message system may include messages having ephemeral video clips or images which are deleted following a deletion trigger event such as a viewing time or viewing completion. In such embodiments, a device implementing the video modification system 160 may identify, track, and modify an object of interest within the ephemeral video clip as the ephemeral video clip is being captured by the device, and transmit the ephemeral video clip to another device using the ephemeral message system.

Software Architecture

Figure 9:
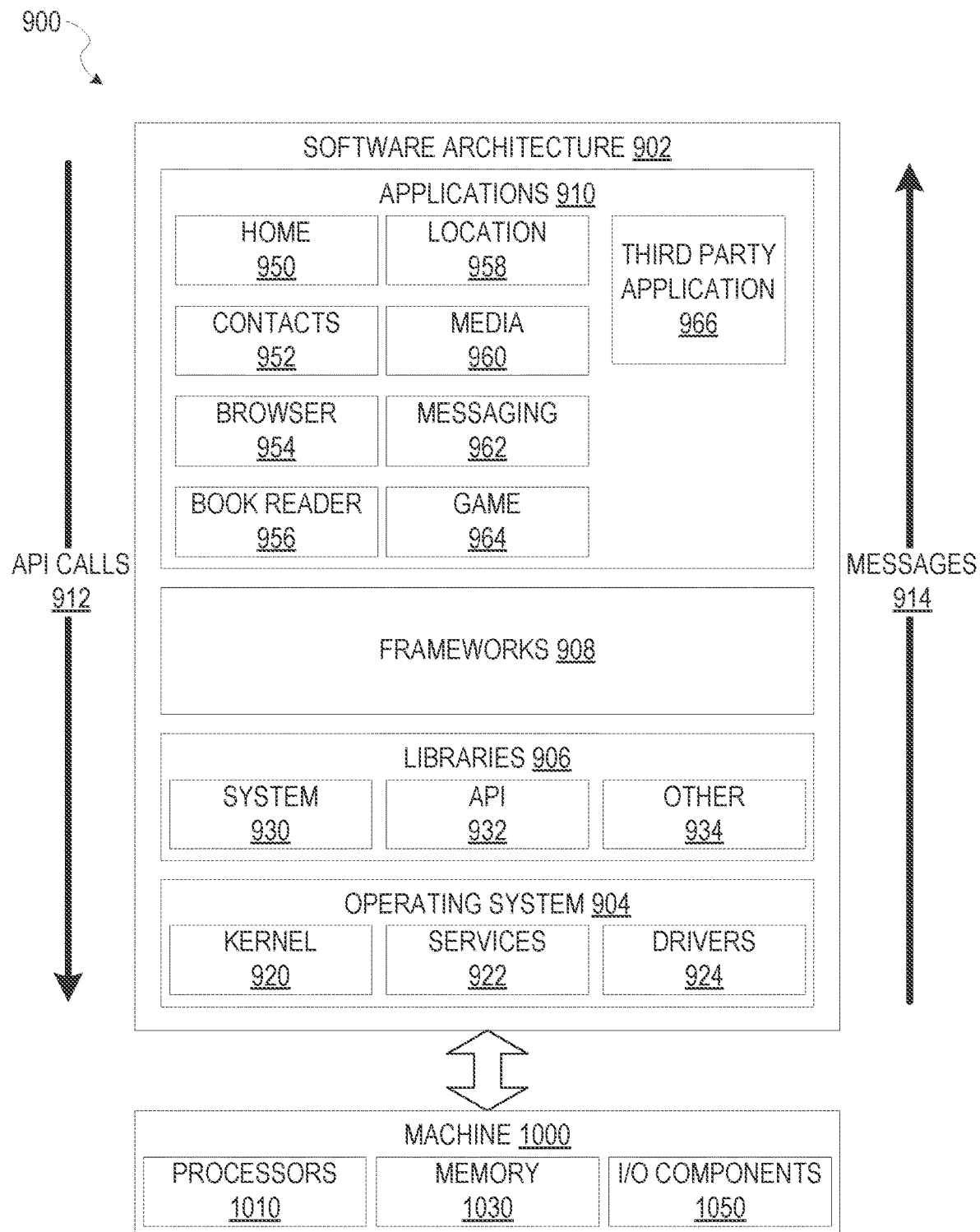
FIG. 9 is a block diagram illustrating an example of a software architecture that may be installed on a machine, according to some example embodiments.

FIG. 9 is a block diagram 900 illustrating an architecture of software 902, which can be installed on the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third party application 966 can invoke the API calls 912 provided by the operating system 904 to facilitate functionality described herein.

Example Machine Architecture and Machine-Readable Medium

Figure 10:
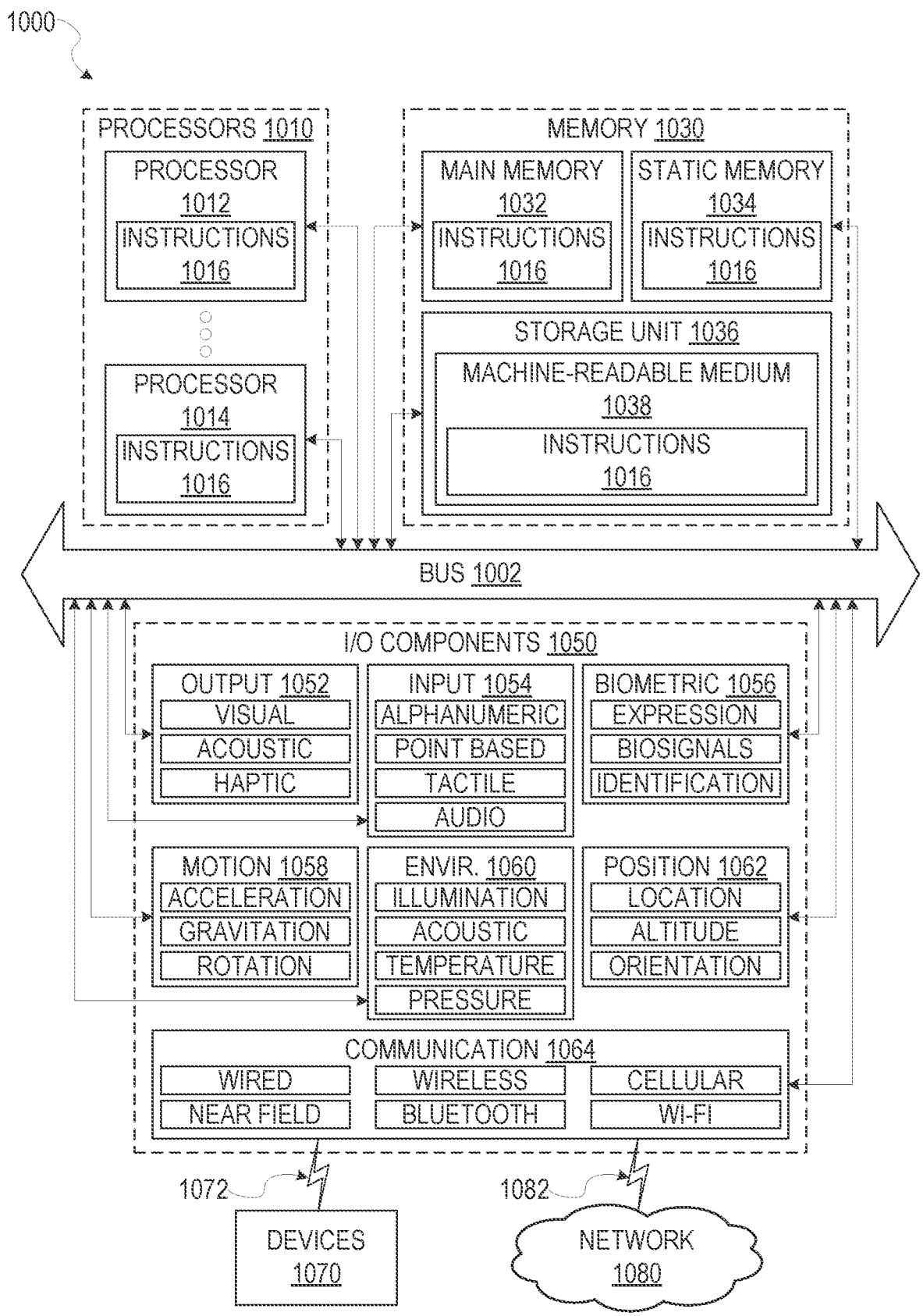
FIG. 10 is a block diagram presenting a diagrammatic representation of a machine in the form of a computer system within which a set of instructions may be executed for causing the machine to perform any of the methodologies discussed herein, according to an example embodiment.

FIG. 10 is a block diagram illustrating components of a machine 1000, according to some embodiments, able to read instructions (e.g., processor-executable instructions) from a machine-readable medium (e.g., a non-transitory processor-readable storage medium or processor-readable storage device) and perform any of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a USB).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLU-ETOOTH® or NFC beacon signal that may indicate a particular location, and so forth.

Transmission Medium

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., HTTP). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of one or more methods are illustrated and described as separate operations, one or more individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   receiving, by one or more processors, a video stream captured by a user device;
   identifying an object of interest in at least one frame of the video stream;
   determining a direction associated with the identified object for each frame of a set of previous frames of the video stream;
   combining the direction of the identified object for the set of previous frames to identify an aggregate direction of the identified object; and
   modifying the video stream to include a graphical element by positioning the graphical element within the at least one frame of the video stream based on the aggregate direction of the identified object.

2. The method of claim 1, wherein identifying the object of interest comprises:

determining pixels within the video stream corresponding to a user's body part;

identifying a position of the body part; and determining, as the direction, a direction of the body part based on the identified position.

3. The method of claim 2, wherein the body part comprises a finger of the user.

4. The method of claim 1, wherein modifying the video stream comprises replacing a portion of the identified object with the graphical element aligned with the direction of the identified object.

5. The method of claim 1, wherein modifying the video stream comprises adding to a portion of the identified object the graphical element.

6. The method of claim 1, wherein the graphical element comprises a weapon in a video game, and wherein the weapon is pointed in the direction associated with the identified object.

7. The method of claim 1 further comprising:

detecting movement of the identified object across a plurality of frames of the video stream; and wherein modifying the video stream to include the graphical element comprises repositioning the graphical element within the plurality of frames based on the detected movement.

8. The method of claim 1 further comprising based on the direction of the identified object, dynamically modifying a histogram threshold for identifying pixels as corresponding to the identified object.

9. A system, comprising:

one or more processors; and a processor-readable storage device storing processor-executable instructions that, when executed by the one or more processors, cause the one or more processors to perform operations comprising:

receiving, by the one or more processors, a video stream captured by a user device;

identifying an object of interest in at least one frame of the video stream;

determining a direction associated with the identified object for each frame of a set of previous frames of the video stream;

combining the direction of the identified object for the set of previous frames to identify an aggregate direction of the identified object; and modifying the video stream to include a graphical element by positioning the graphical element within the at least one frame of the video stream based on the aggregate direction of the identified object.

10. The system of claim 9, wherein identifying the object of interest comprises:

determining pixels within the video stream corresponding to a user's body part;

identifying a position of the body part; and determining, as the direction, a direction of the body part based on the identified position.

11. The system of claim 10, wherein the body part comprises a finger of the user.

12. The system of claim 9, wherein modifying the video stream comprises replacing a portion of the identified object with the graphical element aligned with the direction of the identified object.

13. The system of claim 9, wherein modifying the video stream comprises adding to a portion of the identified object the graphical element.

14. The system of claim 9, wherein the graphical element comprises a weapon in a video game, and wherein the weapon is pointed in the direction associated with the identified object.

15. The system of claim 9, wherein the operations further comprise:

detecting movement of the identified object across a plurality of frames of the video stream; and wherein modifying the video stream to include the graphical element comprises repositioning the graphical element within the plurality of frames based on the detected movement.

16. The system of claim 9, wherein the operations further comprise based on the direction of the identified object, dynamically modifying a histogram threshold for identifying pixels as corresponding to the identified object.

17. A non-transitory processor-readable storage device storing processor-executable instructions that, when executed by a processor of a machine, cause the machine to perform operations comprising:

receiving, by one or more processors, a video stream captured by a user device;

identifying an object of interest in at least one frame of the video stream;

determining a direction associated with the identified object for each frame of a set of previous frames of the video stream;

combining the direction of the identified object for the set of previous frames to identify an aggregate direction of the identified object; and modifying the video stream to include a graphical element by positioning the graphical element within the at least one frame of the video stream based on the aggregate direction of the identified object.

18. The non-transitory processor-readable storage device of claim 17, wherein identifying the object of interest comprises:

determining pixels within the video stream corresponding to a user's body part;

identifying a position of the body part; and determining, as the direction, a direction of the body part based on the identified position.

* * * * *